United States Patent [19]

Tasaka et al.

[11] Patent Number: 5,506,643

[45] Date of Patent: Apr. 9, 1996

[54] LENS-FITTED PHOTOGRAPHIC FLIM UNIT AND EXPOSURE APERTURE SIZE CHANGING DEVICE THEREFOR

[75] Inventors: Hisashi Tasaka, Saitama; Nobuyuki Kameyama; Kazuo Okoyama, both of Kanagawa; Mitsuyoshi Mochida, Tokyo, all of Japan

[73] Assignee: Fuji Photo Film Co., Ltd., Kanagawa, Japan

[21] Appl. No.: 169,203

[22] Filed: Dec. 20, 1993

[30]     Foreign Application Priority Data

Dec. 18, 1992 [JP] Japan ................................ 4-339294
Mar. 1, 1993 [JP] Japan ................................ 5-040198
Mar. 24, 1993 [JP] Japan ................................ 5-065523

[51] Int. Cl.⁶ .......................... G03B 13/10; G03B 37/00
[52] U.S. Cl. ........................... 354/96; 354/159; 354/222
[58] Field of Search ........................... 354/94, 96, 159, 354/222

[56]                 References Cited

U.S. PATENT DOCUMENTS 5,086,311  2/1992  Naka et al. ................................ 354/94 X
5,181,057  1/1993  Takagi et al. ................................ 354/94
5,335,034  8/1994  Lewis et al. ................................ 354/219
5,353,076  10/1994 Goddard ................................ 354/94

FOREIGN PATENT DOCUMENTS 3-122435  12/1991  Japan .

Primary Examiner—Michael L. Gellner
Assistant Examiner—J. K. Han
Attorney, Agent, or Firm—Young & Thompson

[57]                   ABSTRACT

A lens-fitted photographic film unit whose film surface disposed behind an exposure aperture is forwardly concave along the longitudinal direction of the film strip so as to correct distortion by the taking lens. The unit has an exposure aperture size changing device constituted of a manually actuated photography mode changing member for selecting either a standard photography mode for forming a standard size picture frame, or a special photography mode in which a special size picture frame smaller than the standard size picture frame may be formed. A pair of aperture masking plates is movable into margins of the exposure aperture, for masking out parts of the exposure aperture. The masking plates have such shapes that, if images of the aperture masking plates are projected onto a plane perpendicular to an optical axis of the taking lens in the masking position, the images have concave top and bottom margins, so that the special size picture frame has a rectangular shape when the images of the masking plates are projected on that concave film surface instead of on that perpendicular plane.

26 Claims, 35 Drawing Sheets

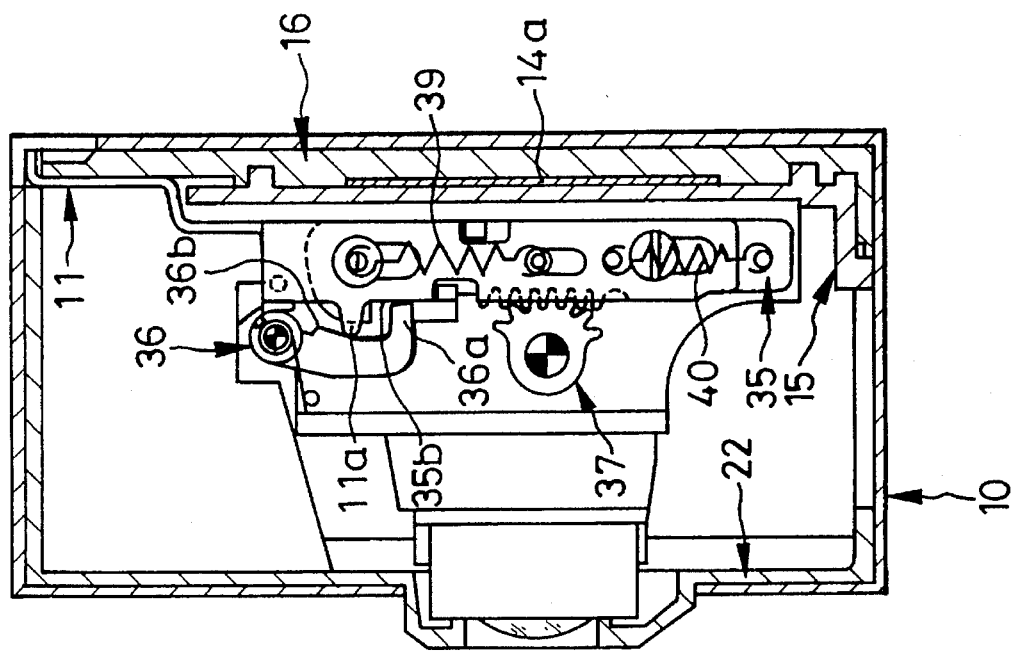
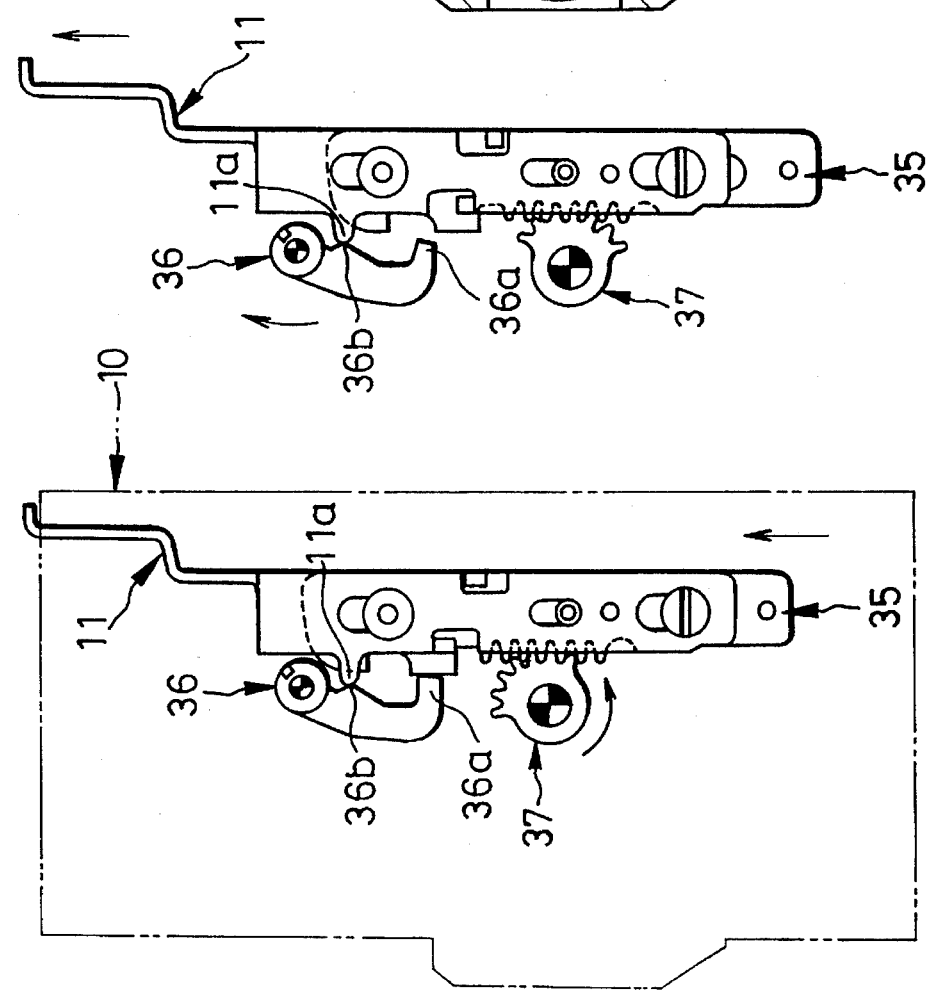
FIG. 8A
FIG. 8B
FIG. 8C

LENS-FITTED PHOTOGRAPHIC FLIM UNIT AND EXPOSURE APERTURE SIZE CHANGING DEVICE THEREFOR

BACKGROUND OF THE INVENTION

1. Field of the Invention

The present invention relates to a lens-fitted photographic film unit and to a device for use therewith for changing the size of picture frames to be formed on photographic film by changing the exposure aperture size.

2. Related Art

Recently, many compact cameras having an exposure aperture size changing device have been produced, wherein one of a full-size photography mode and a panoramic-size photography mode may be selected depending on the scene to be photographed, in response to the operation of a photography mode changing member which is accessible from outside the camera body.

In the full-size photography mode, for example, a 24 mm ×36 mm picture frame of ISO 135 film is provided, and a 89 mm ×127 mm standard-size photoprint (aspect ratio: 1.5) is made from this ISO 135 full-size frame. In the panoramic-size photography mode, for example, a 13 mm×36 mm panoramic-size picture frame is provided, and a 89 mm×254 mm panoramic-size photoprint (aspect ratio: 2.8) is made from this panoramic-size frame.

A filmstrip which has been exposed by the above-described camera with frame size changing device may contain full-size frames and panoramic-size frames. When printing such a filmstrip having different size picture frames, it is necessary to adjust the focal length of a printing lens, the size of opening of a paper mask and that of a film mask, and the amount of advance of photographic paper to the frame size. Therefore, in a mini-lab type photographic printer, for instance, a frame size detector consisting of a plurality of photosensors arranged laterally relative to the filmstrip is disposed before a printing gate, so as automatically to determine the size of each picture frame.

On the other hand, lens-fitted photographic film units (hereinafter referred to as film units) are widely used, each of which has a simple exposure mechanism and contains a film cassette so that anyone may enjoy photography with ease. The taking lens of the film unit is comprised of one or two plastic lens elements. Such a taking lens cannot sufficiently correct aberrations such as spherical aberration, curvature of the field, astigmatism and distortion, by improving its own construction. In order to sufficiently correct the aberrations, especially in the peripheral area of the picture frame, the filmstrip is curved to be forwardly and longitudinally concave in an exposure station of the film unit.

If, therefore, an exposure aperture size changing mechanism having conventional flat rectangular masking plates were simply incorporated into a film unit, there would be undesirable gaps between the masking plates and the film surface because of the curvature of the film surface, so that a resulting picture frame would have a barrel shape having convex or outwardly curved top and bottom margins. Such a barrel-shaped picture frame would be hard to detect as a panoramic picture frame with known frame size detectors.

In addition to this problem, an exposure aperture size change mechanism for a film unit should be inexpensive and easy to assemble, in keeping with the inexpensive nature of the film units.

The film units are also required to be as compact as possible. Therefore, the exposure aperture size changing mechanism for a film unit must not greatly increase the size of the film unit. However, the conventional flat aperture masking plates may cause internal reflection and flare spots because an exposure chamber or light-shielding box for the exposure light of the film unit is also of minimize size.

OBJECTS OF THE INVENTION

In view of the foregoing, an object of the present invention is to provide a film unit embodying an exposure aperture size changing device which can produce rectangular picture frames whose margins are rectilinear.

Another object of the present invention is to provide a film unit embodying an exposure aperture size changing device, wherein no flare is caused even when the exposure aperture is masked.

Another object of the present invention is to provide a film unit embodying an exposure aperture size changing device, which is inexpensive and easy to assemble.

SUMMARY OF THE INVENTION

The above and other objects of the present invention are achieved by an exposure size changing device having a pair of aperture masking plates, which are movable between a full-size or standard position for providing a predetermined full-size exposure aperture and a special position for providing, e.g., a panoramic exposure aperture by masking out upper and lower portions of the full-size exposure aperture, wherein distal ends of these aperture masking plates which are opposed to each other and define top and bottom margins of at least the panoramic exposure aperture, have such shapes that, if images of the aperture masking plates are projecting onto a plane perpendicular to an optical axis of a taking lens in the panoramic position, the images provide a shape having concave or inwardly curved top and bottom margins.

Thereby, a picture frame formed through the panoramic exposure aperture has a rectangular shape having rectilinear and parallel top and bottom margins.

According to a preferred embodiment, the aperture masking plates are pivotally movable between the special position and the full-size position, and each one has at least a cutout in the vicinity of pivots of the aperture masking plates. Thereby, the pivots are allowed to be snapped into bearings formed in a light-shielding box formed in front of the exposure aperture. Each aperture masking plate also has a light-blocking member for blocking light from entering through this cutout.

A cutout for permitting the aperture masking plate to be sufficiently retracted from the optical path inside the light shielding box may be provided with a light blocking member for blocking light from entering through this cutout.

In order to reduce internal reflection, the aperture masking plate may be curved to remove an intermediate portion thereof from the optical path or may have light trapping grooves.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding pans throughout the several views, and wherein:

FIGS. 8A to 8C illustrate the operation of the exposure aperture size changing unit;

DETAILED DESCRIPTION OF THE PREFERRED EMBODIMENTS

Figure 1:
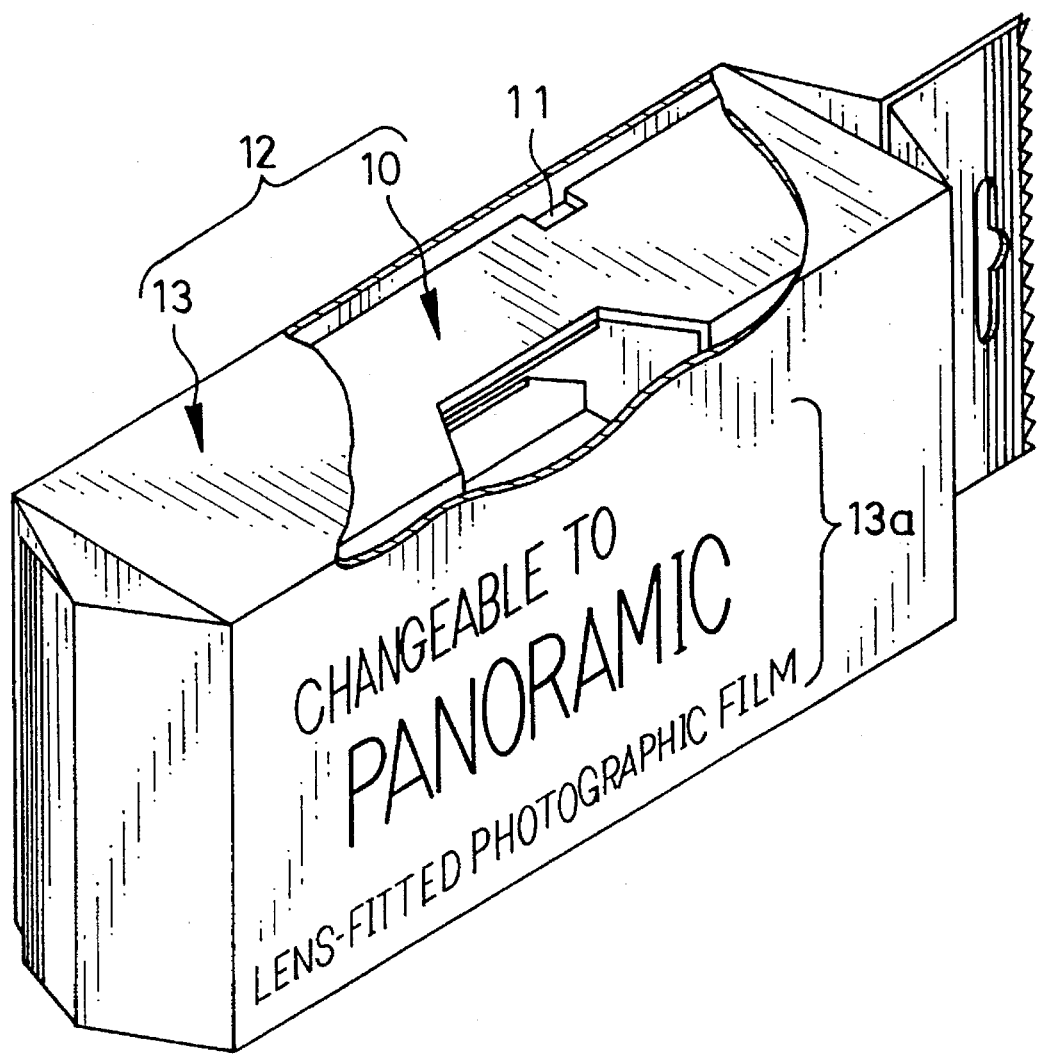
FIG. 1 is a perspective view of a film unit wrapped in a package according to a first embodiment of the present invention.

Referring to FIG. 1, a lens-fitted film unit package 12 is constituted by a lens-fitted film unit 10 and a wrapping 13 covering the film unit 10. A laminated sheet made of plastic films and an aluminum layer interposed therebetween is used as the wrapping, the laminated sheet providing imperviousness to light and moisture. The film unit is inserted in the tubular laminated sheet wrapping 13, and thereafter both the ends of the tubular wrapping 13 are heat sealed. Printed on the outer surface of the wrapping 13 are indicia 13a that the film unit can be changed to a panoramic photography mode when necessary.

Figure 2:
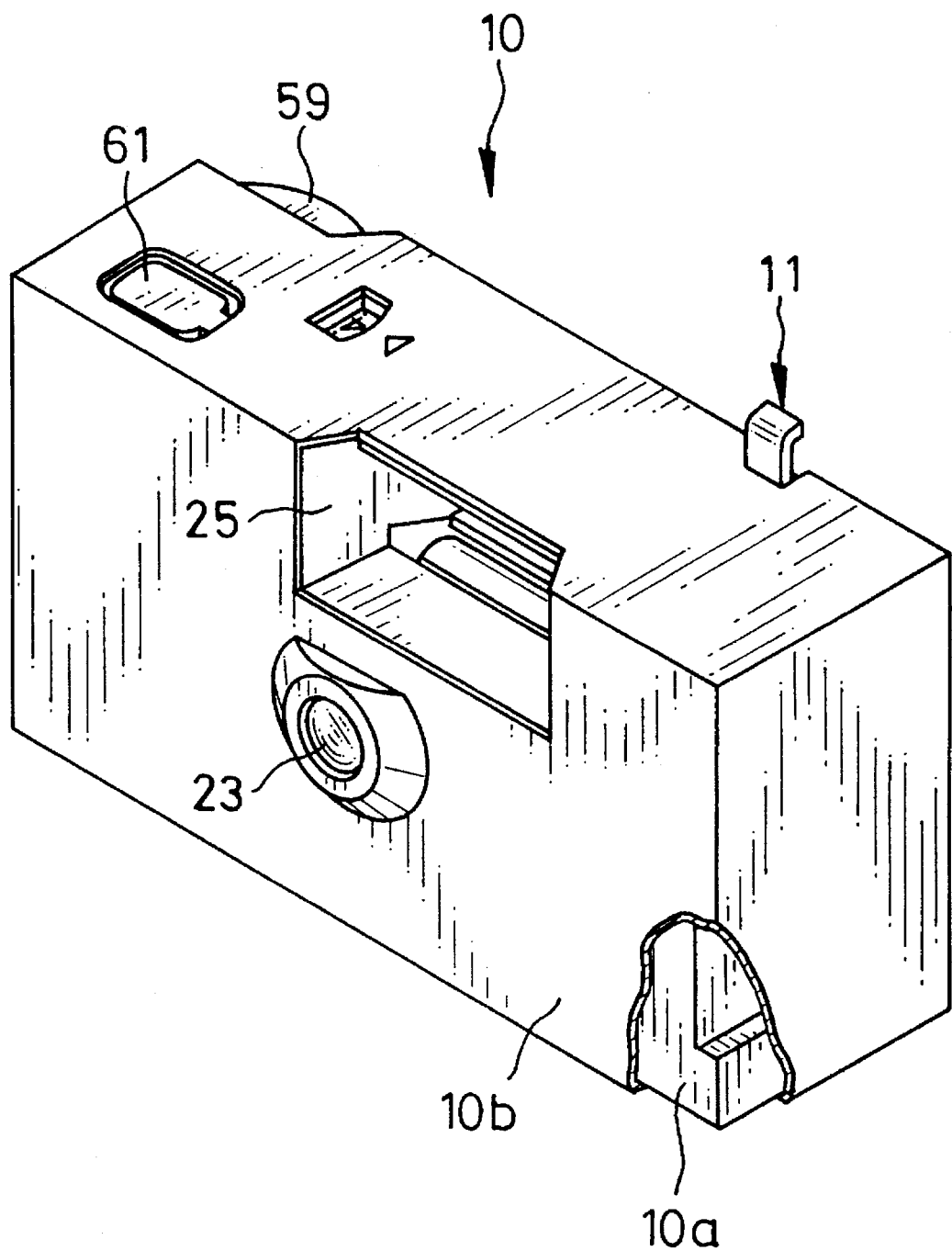
FIG. 2 is a perspective view of the film unit shown in FIG. 1.

Referring to FIG. 2, the film unit 10 has a film housing 10a and a cardboard box 10b accommodating the film housing 10a. The cardboard box 10b is used for providing instructional and ornamental effects for the film housing 10a, the outer surface of box 10b being color-printed ornamentally and printed with indicia similar to indicia 13a on the wrapping 13 and other notices for photography and photofinishing.

The film housing 10a is provided with a photography mode changing lever or frame size changing lever 11 for selecting either a full-size photography mode or a panoramic photography mode, the lever 11 being accessible from outside the film unit. If the photography mode changing lever 11 is positioned as shown in FIG. 2, the full-size photography mode is selected. When the photography mode changing lever 11 is depressed, the film unit is switched to the panoramic photography mode. The film unit set to the panoramic photography mode is covered with the wrapping 13, thereby indicating the panoramic photography mode and in addition, the wrapping 13 is thus prevented from being torn by the edge of the photography mode changing lever 11. A taking lens 23 is made of one or two plastic lens elements, and has a focal length of 32 mm. In the field of lens-fitted film units, the photography method wherein a so-called standard lens of, for example, 25 to 40 mm, is used for forming a full-size frame for a standard print on a photographic film, is called "standard photography". Reference numeral 25 represents a direct through view finder.

Figure 3:
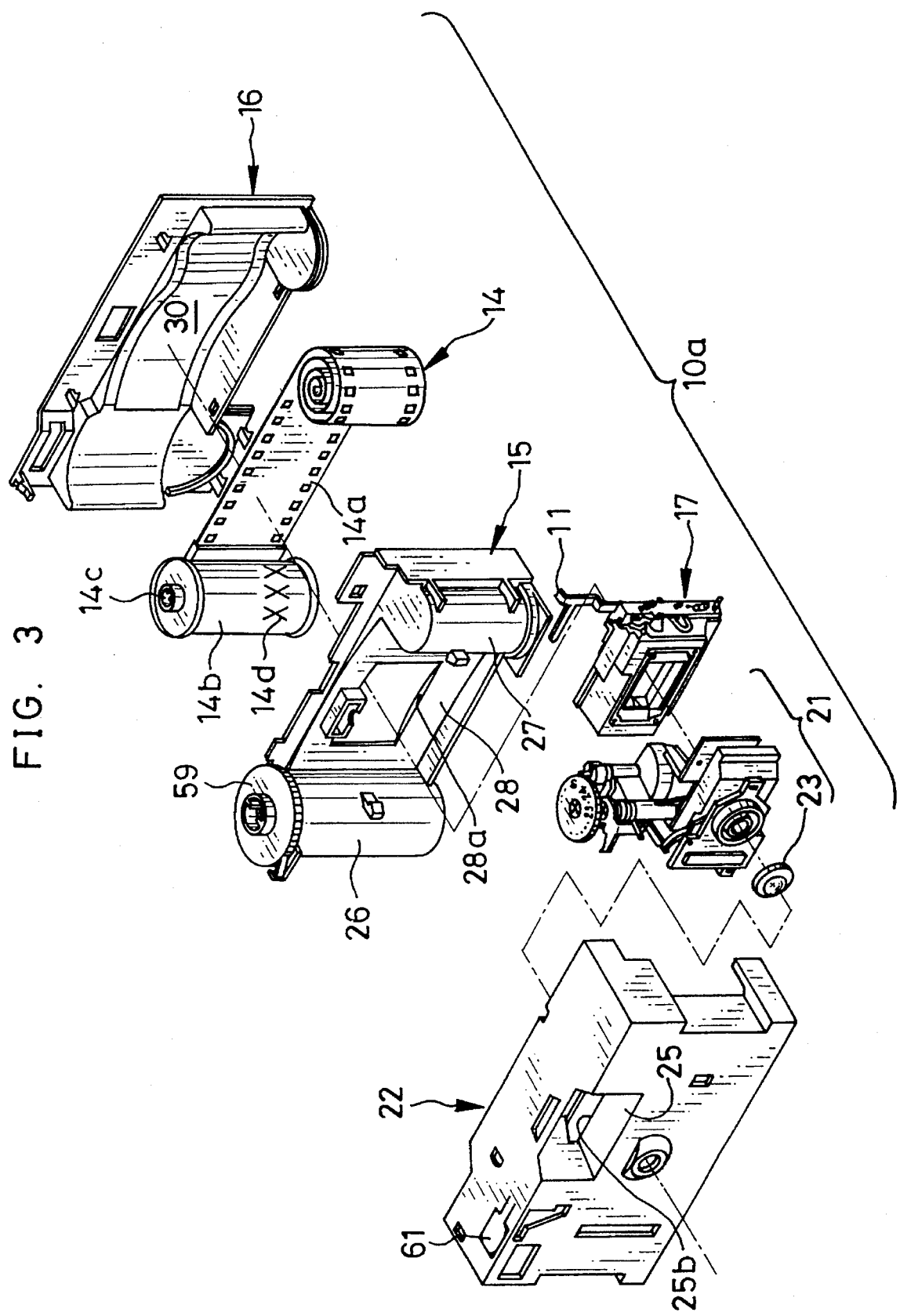
FIG. 3 is an exploded perspective view of a film housing.

Referring to FIG. 3, the film housing 10a is constructed of a main body 15, a rear cover 16, and a front cover 22. The main body 15 is loaded with a photographic film cassette 14 of 135 type specified by International Standards Organization ISO 1007, 1979. Mounted on the front side of the main body 15 is an exposure aperture size changing unit 17 in front of which an exposure unit 21 is mounted. The rear cover 16 is detachably mounted on the rear of the main body 15 to shield light incident to the main body 15. The front cover 22 is detachably mounted on the front side of the main body 15.

The exposure unit 21 is an assembly of a film winding stop mechanism, a shutter 24, a taking lens 23, and the like. A finder 25 is integrally formed with the front cover 22. The photographic film cassette 14 has a photographic film 14a and a cassette 14b for light shielding and accommodating the film 14a. The cassette 14b has a spool 14c to which the trailer of the photographic film 14a is fixed. As the spool 14c rotates, the exposed photographic film 14 is wound about the outer periphery of the spool 14c. Indicia 14d indicating that the photographic film 14a contains both full-size frames and panoramic-size frames, are provided on the outer surface of the cassette 14a.

Figure 4:
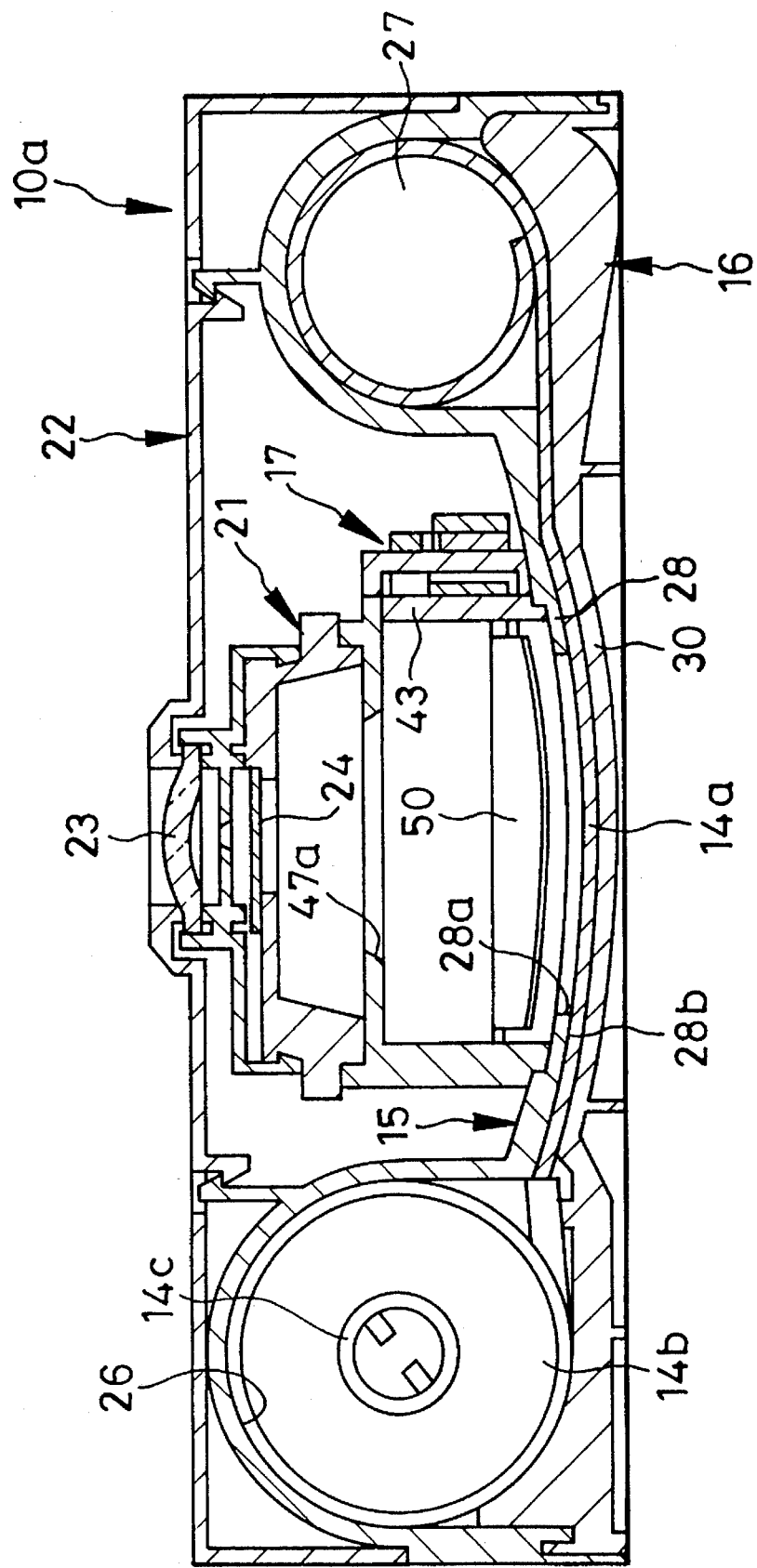
FIG. 4 is a lateral cross-sectional view of the film housing.
Figure 5:
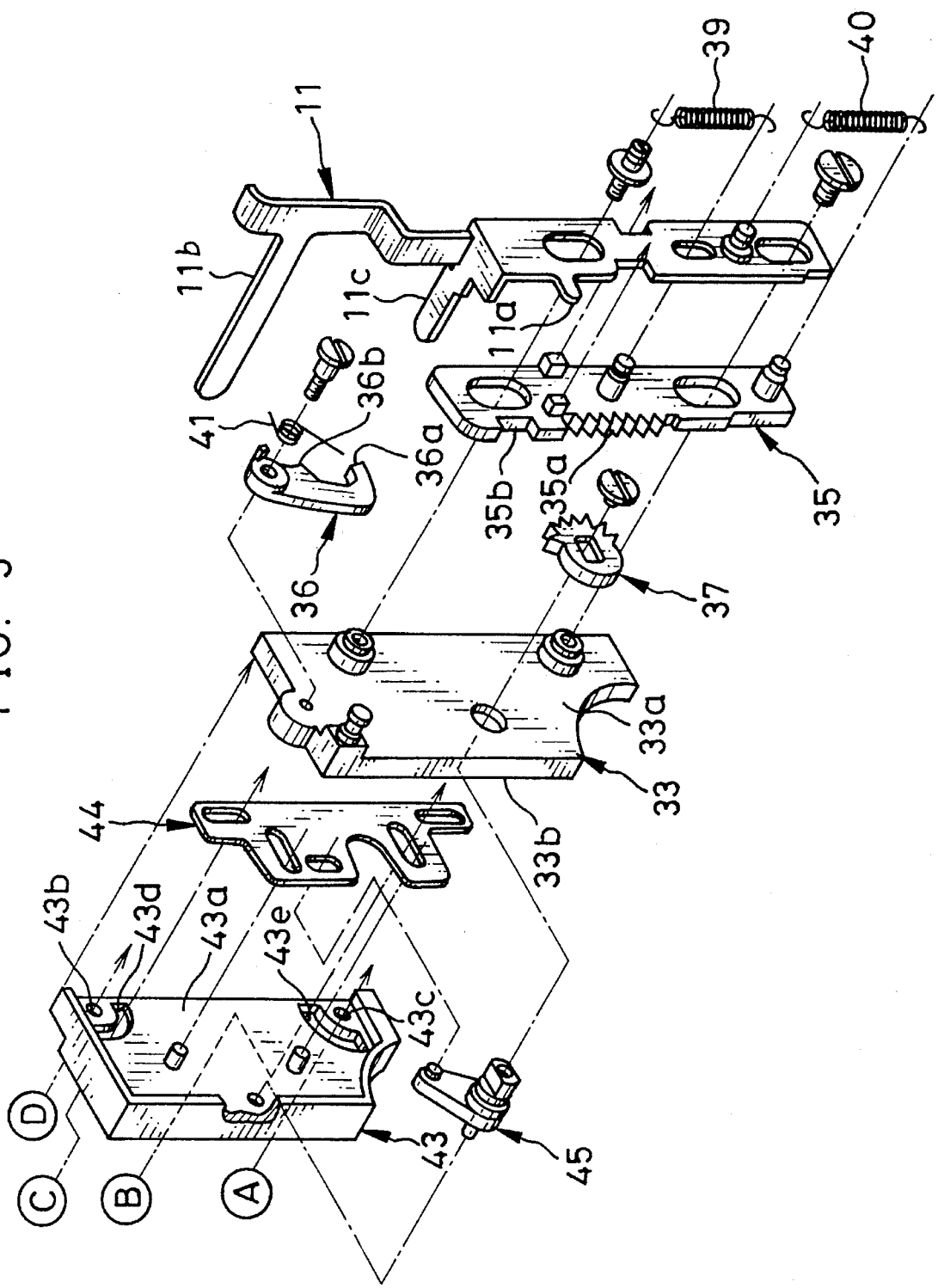
FIG. 5 is an exploded perspective view of the changing mechanism of an exposure aperture size changing unit.

As shown in FIG. 4, the main body 15 is formed with a cassette chamber 26 for accommodating the cassette 14b and a film roll chamber 27 for accommodating a roll of the photographic film 14a. Between the cassette chamber 26 and film roll chamber 27, an exposure frame 28 is formed having an exposure aperture 28a of 24×36 mm (aspect ratio of 1.5). The rear surface of the exposure frame 28 constitutes a film support surface 28b which is concavely curved along the film advance path to compensate for the distortion of the taking lens 23. The front surface of the rear cover 16 forms a film pressure surface 30 curved in correspondence with the film support surface 28b.

Figure 6:
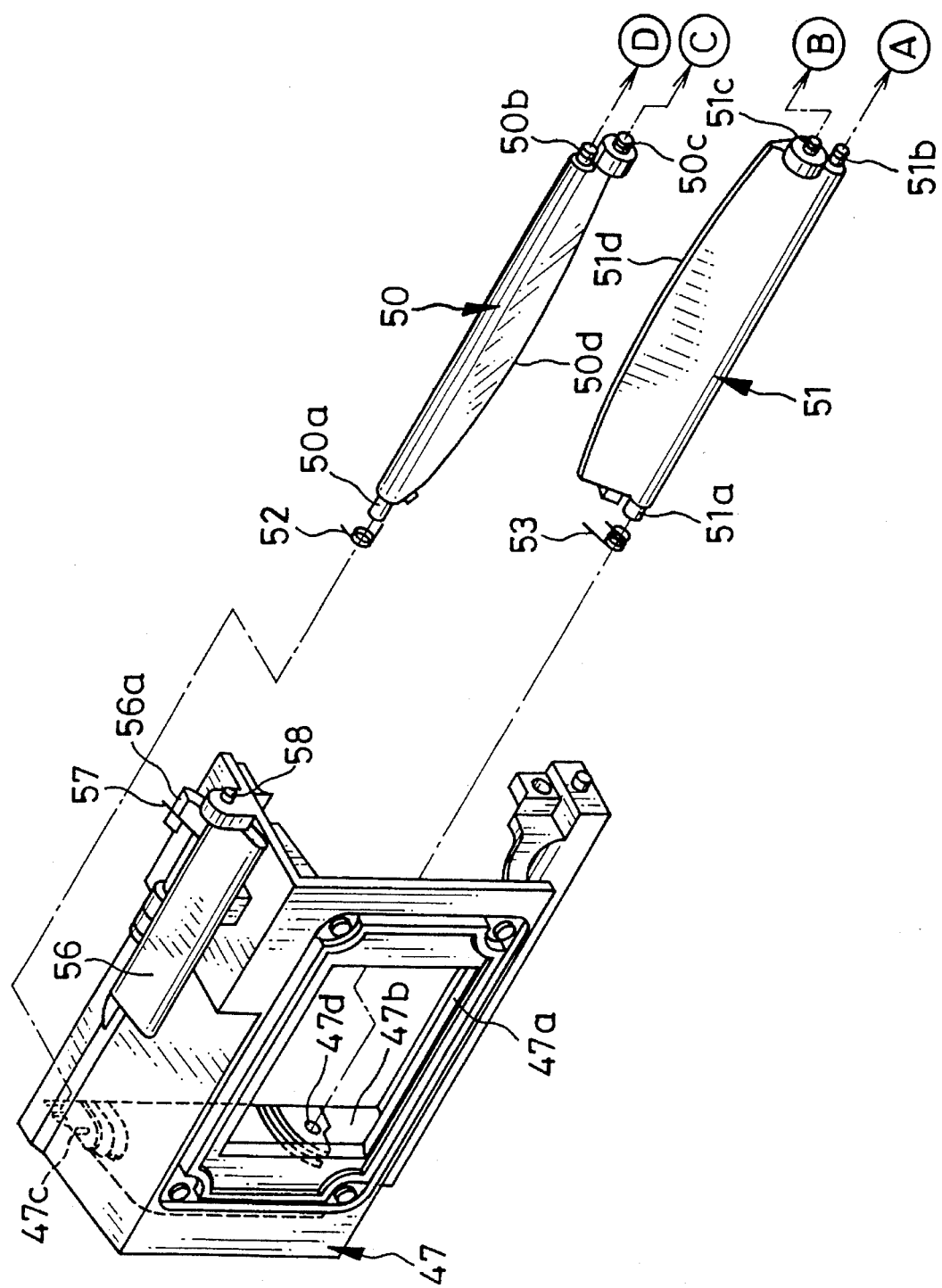
FIG. 6 is an exploded perspective view of the masking unit of the exposure aperture size changing unit.
Figure 7:
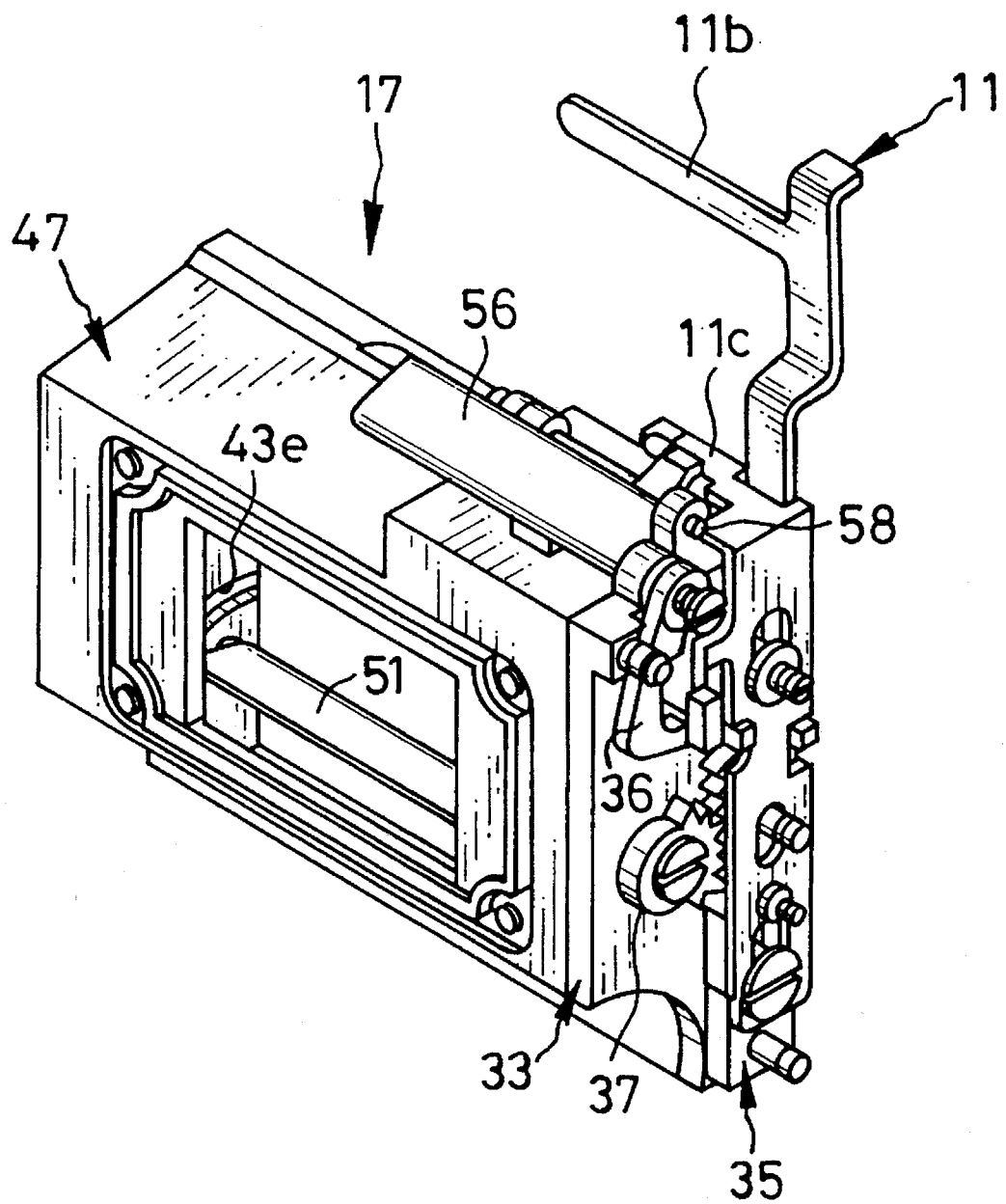
FIG. 7 is a perspective view showing the entirety of the exposure aperture size changing unit.

Referring to FIGS. 5 to 8 showing the exposure aperture size changing unit 17, mounted on the outer side 33a of a base 33 are the photography mode changing lever 11, a rack plate 35, a retaining claw 36, and a sector gear 37. The photography mode changing lever 11 is mounted to be movable up and down. The rack plate 35 is movable up and down between the base 33 and the photography mode changing lever 11, and a gear unit 35a formed on the rack plate 35 meshes with the sector gear 37. Springs 39 and 40 extend between the photography mode changing lever 11 and rack plate 35. The spring 39 biases the rack plate 35 upward relative to the base 33, and the spring 40 biases the photography mode changing lever 11 downward relative to the rack plate 35. In FIG. 7, the springs 39 and 40 are not shown so as to simplify the drawing.

The retaining claw 36 is biased in the counterclockwise direction by a torsion spring 41. The retaining claw 36 is integrally formed with a locking claw 36a and a release claw 36b. When the photography mode changing lever 11 is depressed to select the panoramic photography mode, the locking claw 36a engages with a recess 35b of the rack plate 35. When the photography mode changing lever 11 is pulled up to select the full-size photography mode, a projection 11a of the lever 11 abuts the release claw 36b to release the locking claw 36a from the recess 35b.

Between the inner side 33b of the base 33 and the outer side 43a of a left side plate 43, there are mounted a slide plate 44 movable in the optical axis direction of the taking lens 23 and a rotary lever 45 coupled to the sector gear 37.

The distal end of the rotary gear 45 engages with the slide plate 44 to move the slide plate 44 with the rotation of the sector gear 37. A light shielding box 47 is formed with openings 47a and 47b for guiding light from a subject via the taking lens 23 to the exposure aperture 28a. The left side plate 43 is fitted to the right side of the light shielding box 47. Upper and lower aperture masking plates 50 and 51 are housed in the box 47.

On opposite sides of the aperture masking plates 50 and 51, there are mounted shafts 50a and 50b, and 51a and 51b. Coupling members 50c and 51c are mounted on the aperture masking plates 50 and 51 spaced apart by a predetermined distance from the shafts 50b and 51b. The shafts 50a, 50b, 51a, and 51b are fitted in bearings 47c, 43b, 47d, and 43c formed in the light shielding box 47 and left side wall 43 on the inner sides thereof so that the aperture plates 50 and 51 can be swingably supported.

The coupling members 50c and 51c couple the slide plate 44 via guide grooves 43d and 43c on the left side plate 43. When the slide plate 44 moves, the coupling members 50c and 51c move along the guide grooves 43d and 43e. Therefore, the aperture masking plates are swung between the full-size position retracted from the taking optical path and the panoramic position, entering the taking optical path, wherein they are disposed perpendicular to the optical path. The aperture masking plates may be inclined relative to the optical path in the panoramic position. In the full-size position, the aperture masking plates 50 and 51 are retracted so as not to intercept light incident on the exposure aperture 28a from a subject. In the panoramic position, the aperture masking plates shield the upper and lower areas of the exposure aperture 28a to mask it and to provide the exposure aperture size corresponding to the laterally elongated panoramic frame. The aperture masking plates 50 and 51 are urged toward the full-size position by torsion springs 52 and 53.

The aperture masking plates 50 and 51 have their distal edges 50d and 51d curved and extended outwardmost at the central area to match the curved shape of the film support surface 28b. Therefore, the upper and lower sides of the panoramic frame are prevented from being curved.

The exposure aperture size changing unit 17 has a finder view field changing mechanism which changes the field of view of the finder 25 between a full-size field of view and a panoramic-size field of view in response to the actuation of the photography mode changing lever 11. This mechanism comprises an upper finder masking plate 11b and a lower finder masking plate 56. By masking the upper and lower areas of the finder 25 having the full-size field of view, the full-size field of view can be switched to the panoramic-size field of view. The upper finder masking plate 11b is integrally formed with the photography mode changing lever 11, and enters the finder 25 from the recess 25a (FIG. 9) as the photography mode changing lever 11 is moved.

The lower finder masking plate 56 is rotatably mounted on a shaft 58 parallel to the film advance direction at the top of the light shielding box 47. The lower finder masking plate 56 is continuously urged toward the full-size position (retracted position) retracted from the finder 25 by a torsion spring 57. The lower finder masking plate 56 is integral with a contact plate 56a which engages a pressure plate 11c of the photography mode changing lever 11. As the photography mode changing lever 11 is depressed, the lower finder masking plate 56 enters the finder 25 via the opening 25b of the finder 25.

The operation of the above embodiment will be described next. The film unit 10 is covered with the wrapping 13 while in the special photography mode, i.e. the panoramic photography mode. From the indicia 13a on the outer surface of the wrapping 13, a user will be notified, when buying the lens-fitted film unit package 12, that the package 12 is of the type changeable between full-size photography and panoramic-size photography when desired.

Figure 9:
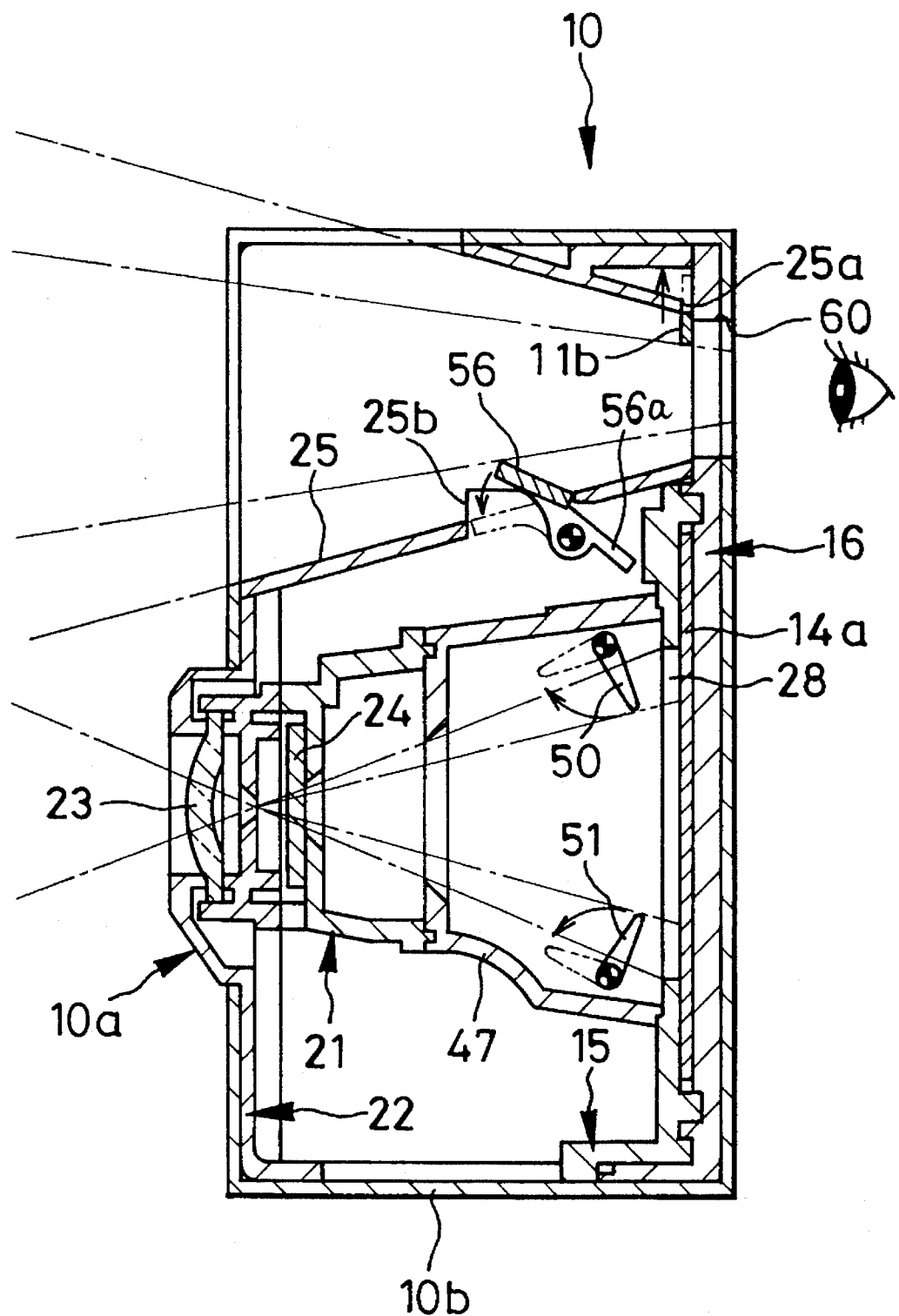
FIG. 9 is a vertical cross-sectional view of the film unit set to the panoramic photography mode.

After buying the lens-fitted film unit package 12, the user tears open the wrapping 13 to remove the film unit 10. At this time, the photography mode changing lever 11 is in the depressed position or panoramic position, as shown in FIG. 1, and as shown in FIG. 8A the locking claw 36a is engaged in the recess 35b to hold the film unit in the panoramic position. As shown in FIG. 9, inside the light shielding box 47, the aperture masking plates 50 and 51 protrude into the optical path to mask the upper and lower areas of the exposure aperture 28a. The finder masking plates 11b and 56 protrude into the optical path of the finder 25 to form a panoramic-size field of view.

To photograph a scene, a winding wheel 59 is rotated to wind the film. With this winding operation, the photographic film 14a is wound about the spool 14c of the cassette 14b. The film unit 10 was set in the factory to a condition in which the shutter 24 is almost fully cocked, so that when even a small portion of the photographic film 14a is rewound into the cassette 14b, the shutter cocking is complete.

After the shutter is completely cocked, a user observes through the finder eye piece window 60 a scene to be photographed. At this time, the upper and lower areas of the full-size field of view of the finder 25 are masked by the finder masking plates 11b and 56 to provide a laterally elongated panoramic field of view. Since the field of view is laterally elongated, even a novice viewing the scene through the finder 25 will be aware of an unusual condition. If the user reads the printing on the cardboard box 10b at this time, the user will learn that the film unit 10 is of a type allowing both the full-size and panoramic-size photography modes. In addition, since the user has seen the panoramic field of view providing a special photography effect, the user can decide which mode to use. In this manner, even a novice can photograph a scene by selecting as desired either the full-size photography mode or the panoramic-size photography mode.

When the shutter release button 61 is operated, the shutter 24 of the exposure unit 21 opens. While the shutter 24 is open, light from the subject falls via the taking lens 23 on the frame of the photographic film 14a at the rear of the exposure aperture 28a. At this time, since the aperture masking plates 50 and 51 are set to the panoramic position, light from the upper and lower areas of the subject is intercepted to form a panoramic-size picture frame 62 indicated by the hatched area of FIG. 10A on the photographic film 14a. This panoramic-size frame 62 has the size L1×L2, for example, 13× 36 mm as shown in FIG. 10B.

Figure 10A:
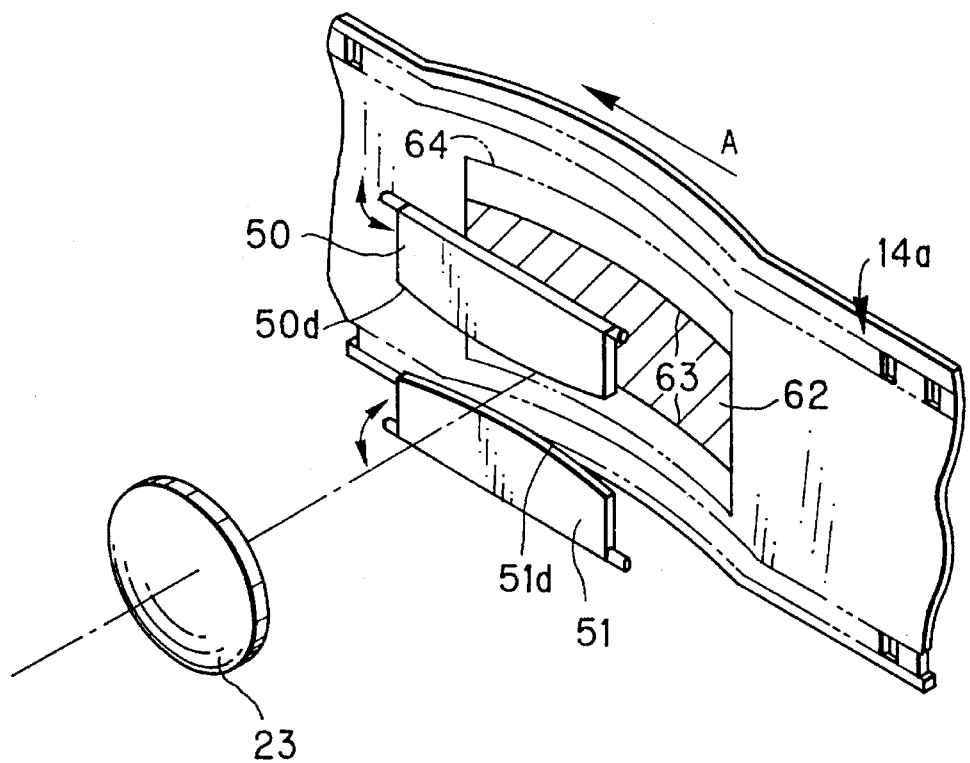
FIG. 10A is a perspective view illustrating the panoramic photography position of the aperture masking plates.
Figure 10B:
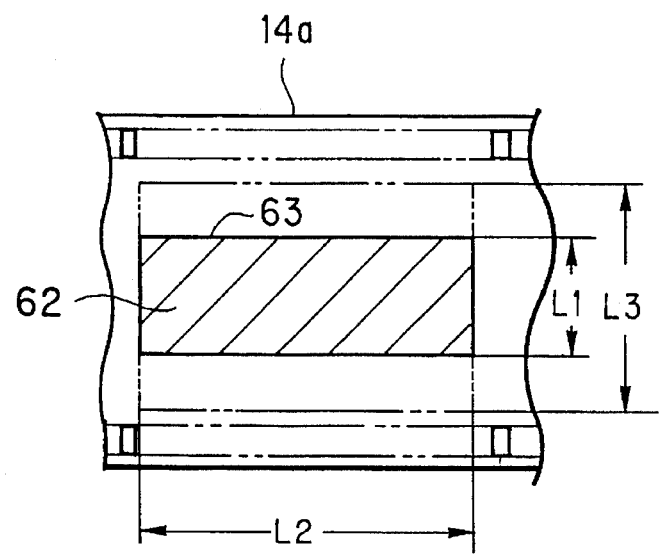
FIG. 10B is a diagram illustrating the difference between a full-size frame and a panoramic-size frame.

As shown in FIG. 10A, the frame of the photographic film 14a in the exposure station is curved with the greatest distance to the subject at the vertical center line thereof, so as to compensate for the distortion of the taking lens 23. The distal edges 50d and 51d of the aperture masks 50 and 51 are convexly curved, although they are spaced from the photographic film 14a. As a result, as shown in FIG. 10B, the upper and lower margins 63 of the panoramic-size frame 62 can be made straight.

For full-size photography, the photography mode changing lever 11 is pulled up to set the full-size photography mode. With this operation, as shown in FIG. 8B, the projection 11a abuts the release claw 36b to make the retaining claw 36 rotate in the clockwise direction. As the retaining claw 36 rotates, as shown in FIG. 8C the engagement of the locking claw 36a in the recess 35b is released so that the rack plate 35 moves in the direction of moving the photographic mode changing lever 11 by the force of the spring 40. As the rack plate 35 moves, the rotary lever 45 rotates in the counterclockwise direction via the sector gear 45. As the rotary lever 45 rotates, the slide plate 44 moves forward so that the aperture masking plates 50 and 51 are rotated to the full-size position as indicated by phantom lines in FIG. 9. As also indicated by phantom lines, the finder mask plates 11b and 56 retract from the finder optical path to set the finder 25 to the full-size field of view.

After the framing is determined in this condition, the shutter release button 61 is depressed to photograph a scene. Light from a subject transmitted through the taking lens 23 falls on the photographic film 14a without being intercepted by the upper and lower aperture masking plates 50 and 51. As a result, as indicated by phantom lines in FIG. 10A, a full-size picture frame 64 is formed on the photographic film 14a. The full-size frame 64 has a size L3×L2, e.g., 24×36 mm as shown in FIG. 10B.

Photography continues thereafter by setting the photographic mode changing lever 11 before or after the film winding to select either the full-size photography mode or the panoramic-size photography mode. After all frames have been photographed, the film unit 10 containing the photographic film cassette 14 is delivered to a laboratory. In the laboratory, the photographic film cassette is taken out of the film unit 10. At this time, since the indicia 14d printed on the cassette 14b indicate that the photographic film includes both full-size frames and panoramic-size frames, this film can be assigned to the proper group of films.

After this grouping, the photographic film 14a is pulled out of the cassette 14b and coupled to other films of the same group to form one long film. This long film is developed and inspected. During this film inspection, a mark is added, for example, to a panoramic-size frame in order to distinguish between full-size and panoramic-size frames. After film inspection, the long film is fed to a photographic printer to print it.

In this printing process, only full-size frames are first printed. Next, after changing the print magnification factor of the printing lens and the size of the film mask and paper mask, only panoramic-size frames are printed. The magnification factor for the full-size frame is about 3.5, and that for the panoramic-size frame is about 7. After such a printing process, the user is given the developed photographic film and its photoprints. The empty film unit 10 is not given to the user but is returned to the factory to recycle available components.

Figure 11A:
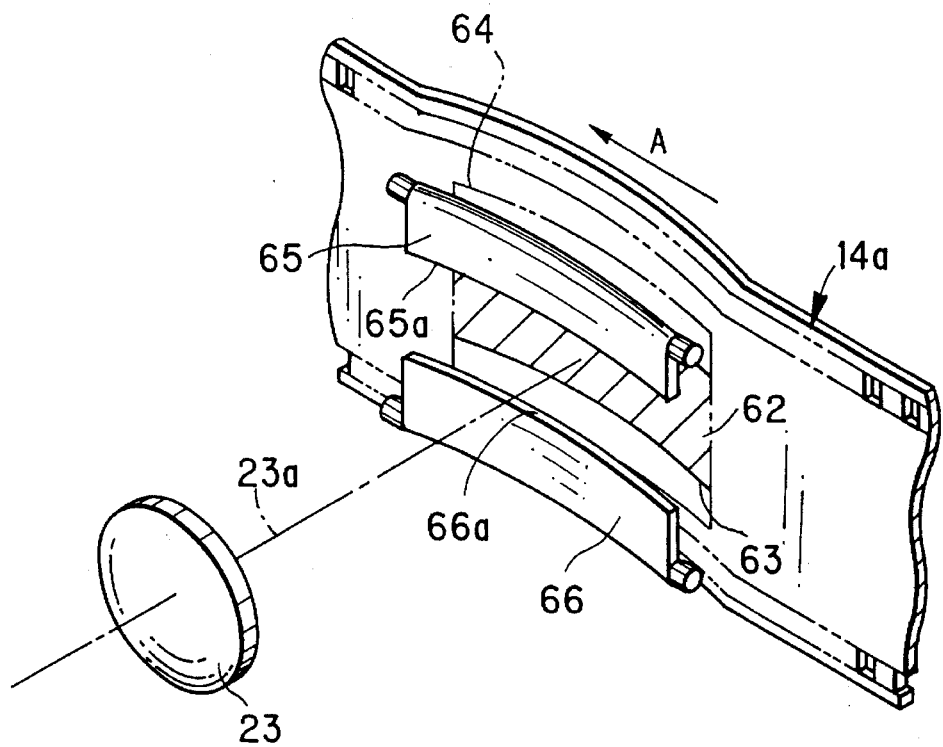
FIGS. 11A and 11B are views similar to those of FIGS. 10A and 10B and illustrate aperture masking plates according to another embodiment of the invention and the resulting panoramic-size picture frame of this embodiment.
Figure 11B:
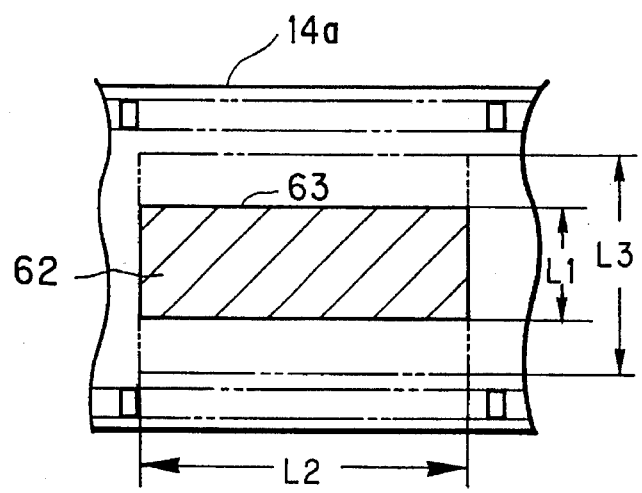
Figure 12:
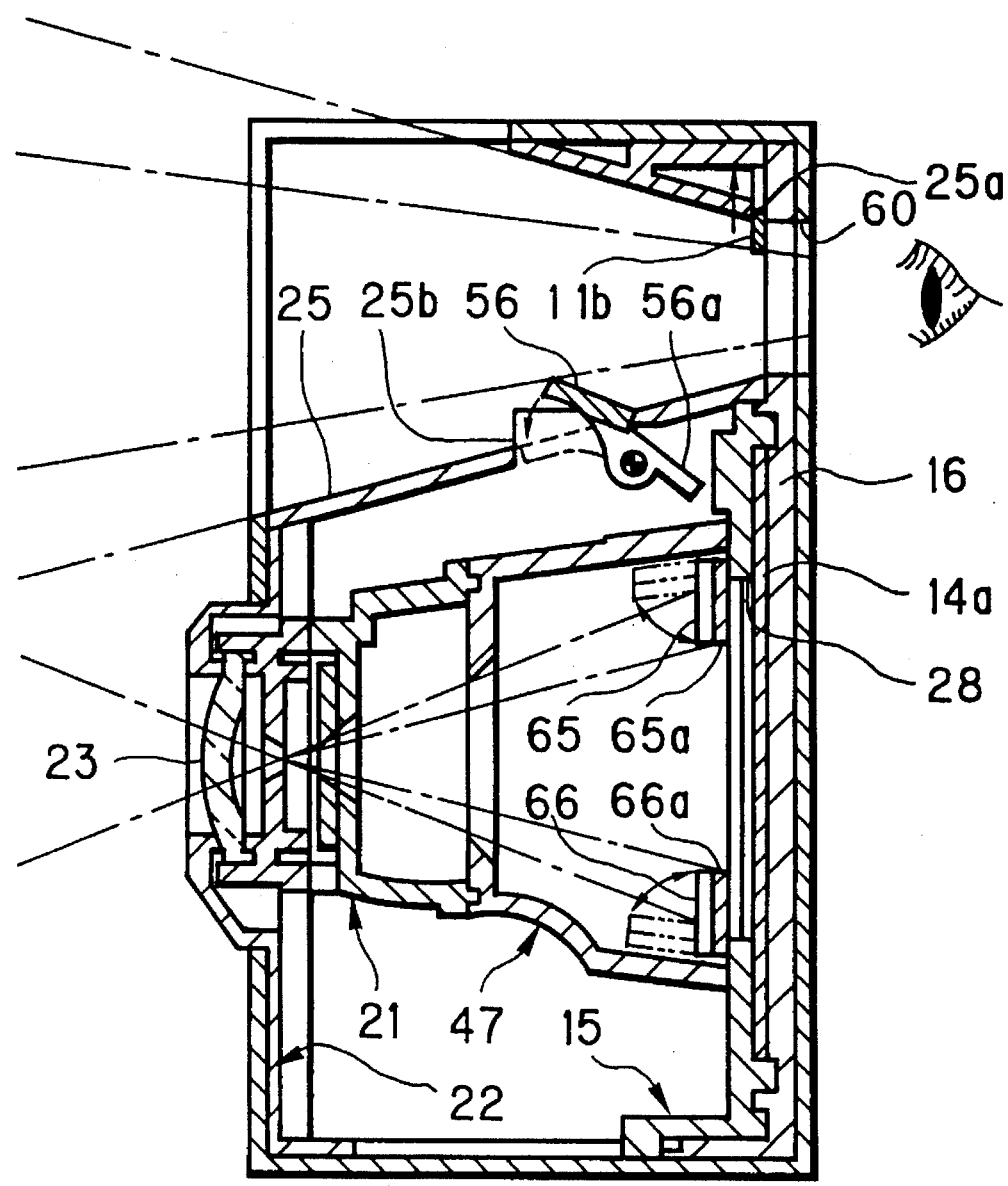
FIG. 12 is a view similar to that of FIG. 9 and illustrating a film unit using the aperture masking plates shown in FIG. 11A.

FIG. 11A shows another embodiment of aperture masking plates 65 and 66 which have a curve that corresponds to the curve of the film support surface 28b in the panoramic position shown in FIG. 11A, such that distal edges 65a and 66a of the plates 65 and 66 have a constant distance from the film 14a throughout the length thereof when opposed to each other in the panoramic position, and simultaneously extend parallel to the film transporting direction shown by an arrow A in FIG. 11A. By virtue of this shape of the plates 65 and 66, the horizontal margins 63 of the panoramic picture frame 62 will be parallel to the film longitudinal direction A and have no distortion, as shown in FIG. 11B. According to this embodiment, the plates 65 and 66 are disposed near the film 14a in the panoramic position in a manner as shown by solid lines in FIG. 12, thereby improving the sharpness of the horizontal margins 63 of the panoramic picture frame 62.

Figure 13:
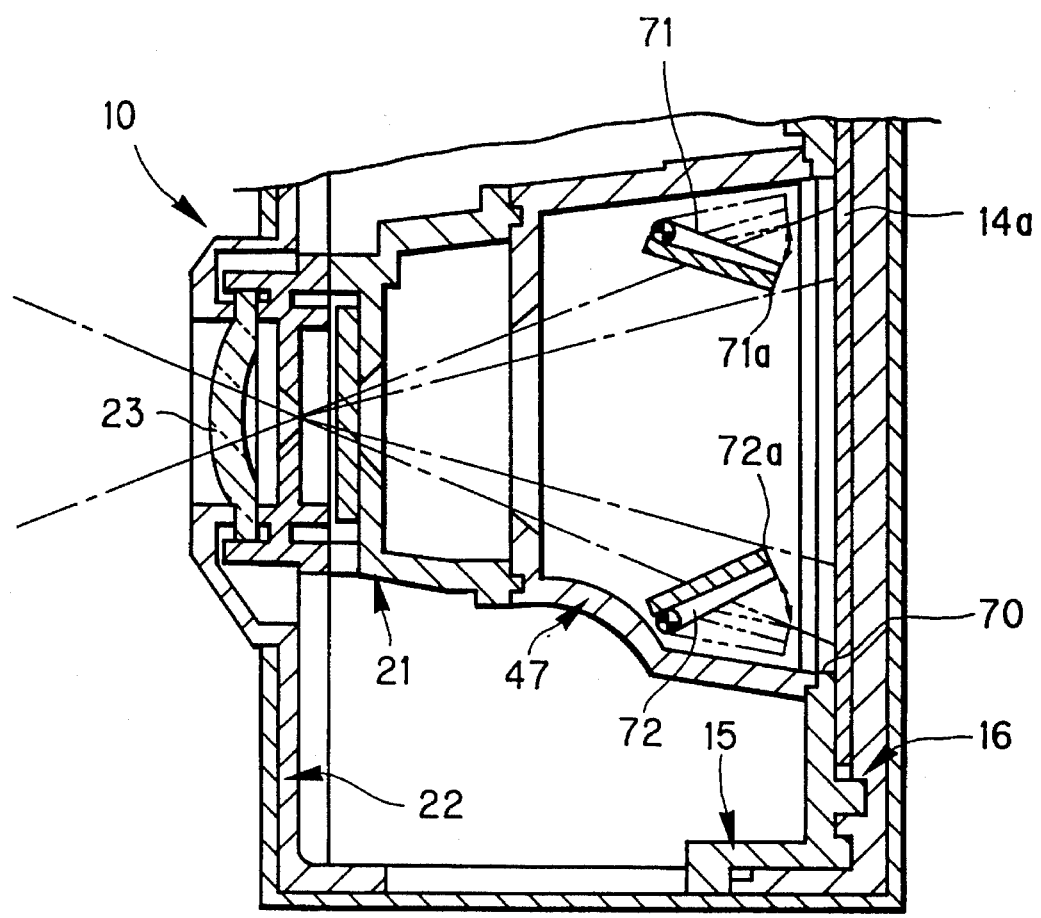
FIG. 13 is a vertical sectional view illustrating essential parts of another embodiment of the invention wherein the size of the exposure aperture is defined by masking plates in full-size photography as well as in panoramic photography.
Figure 14A:
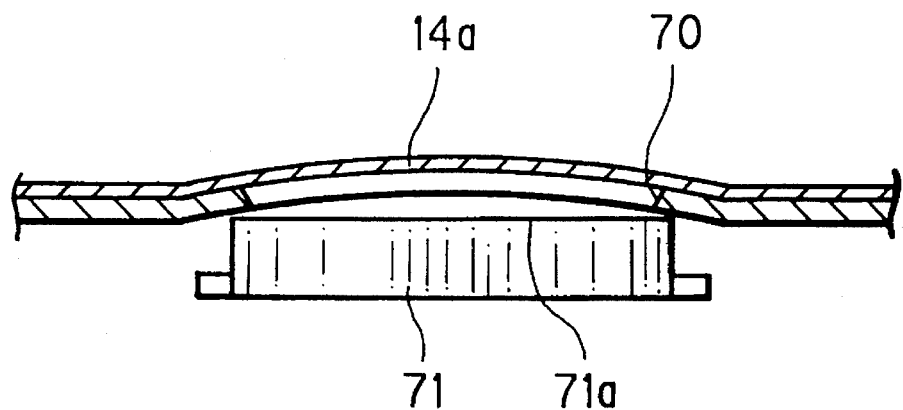
FIG. 14A is a plan view of the aperture masking plate shown in FIG. 13 positioned transversely to the film surface.
Figure 14B:
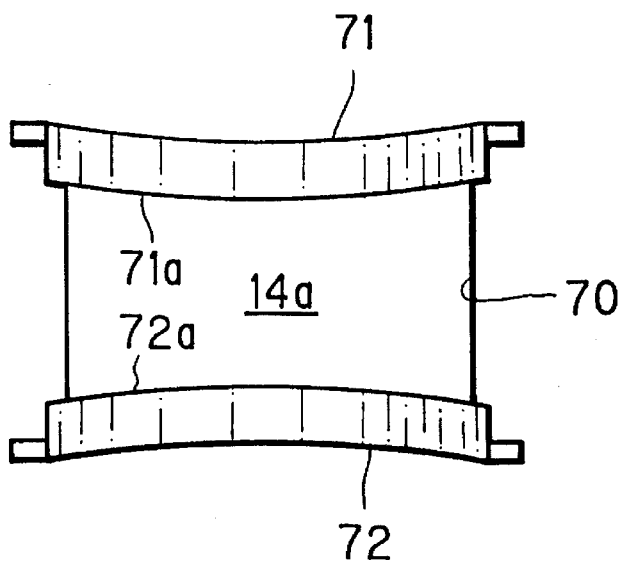
FIG. 14B is a front view of the aperture masking plates shown in FIG. 13 positioned in a panoramic position.

Although the aperture masking plates 50 and 52 or 65 and 66 of the above-described embodiments are merely used to define the size of the panoramic exposure aperture, it is possible to use a pair of masking plates 71 and 72 for defining the size of the full-size exposure aperture too, as is shown in FIG. 13, wherein solid lines indicate the panoramic position, whereas phantom lines indicate the full-size position of the aperture masking plates 71 and 72. The distal edges 71a and 72a of the plates 71 and 72 always define the horizontal margins of the picture frame of full size as well as of panoramic size. The edges 71a and 72a each display a rectilinear contour in the plan view shown in FIG. 14A wherein the aperture masking plate 71 is oriented transverse to the film 14a and is viewed from the top, while the edges 71a and 72a each display a concave contour in the front view shown in FIG. 14B wherein the aperture masking plates 71 and 72 are inclined to the film 14a.

Figure 15:
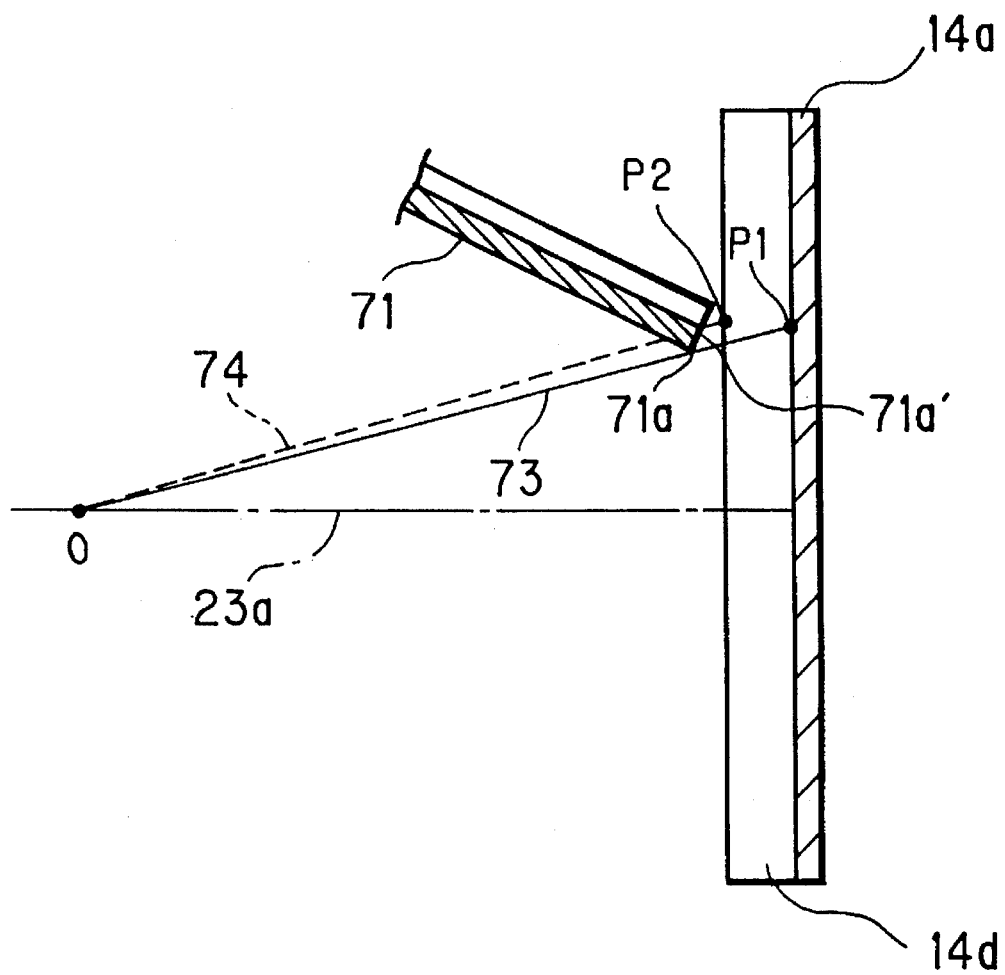
FIG. 15 is an explanatory view of the embodiment shown in FIG. 13.

In this embodiment, the curvature of these aperture masking plates 71 should be defined such that, on the forwardly concave film surface 14d of the film 14a, an incident point P1 of light traveling along an optical path 73 indicates by a solid line in FIG. 15, that is, traveling through the principal point O of the taking lens 23 and the middle of the edge 71a, is of equal height as an incident point P2 of light traveling along an optical path 74 indicated by dashed line in FIG. 15, that is, traveling through the principal point O and an end 71a' of the edge 71a, relative to the optical axis 23a of the taking lens 23. Thereby, the horizontal margins of the picture frame are formed parallel to the film transporting direction in either photography position. In this embodiment, an aperture 70 formed in a main body should be larger than the full size picture frame. Needless to say, the aperture masking plates 71 and 72 may be pivoted by the same mechanism as shown in FIGS. 6 and 7.

Figure 16:
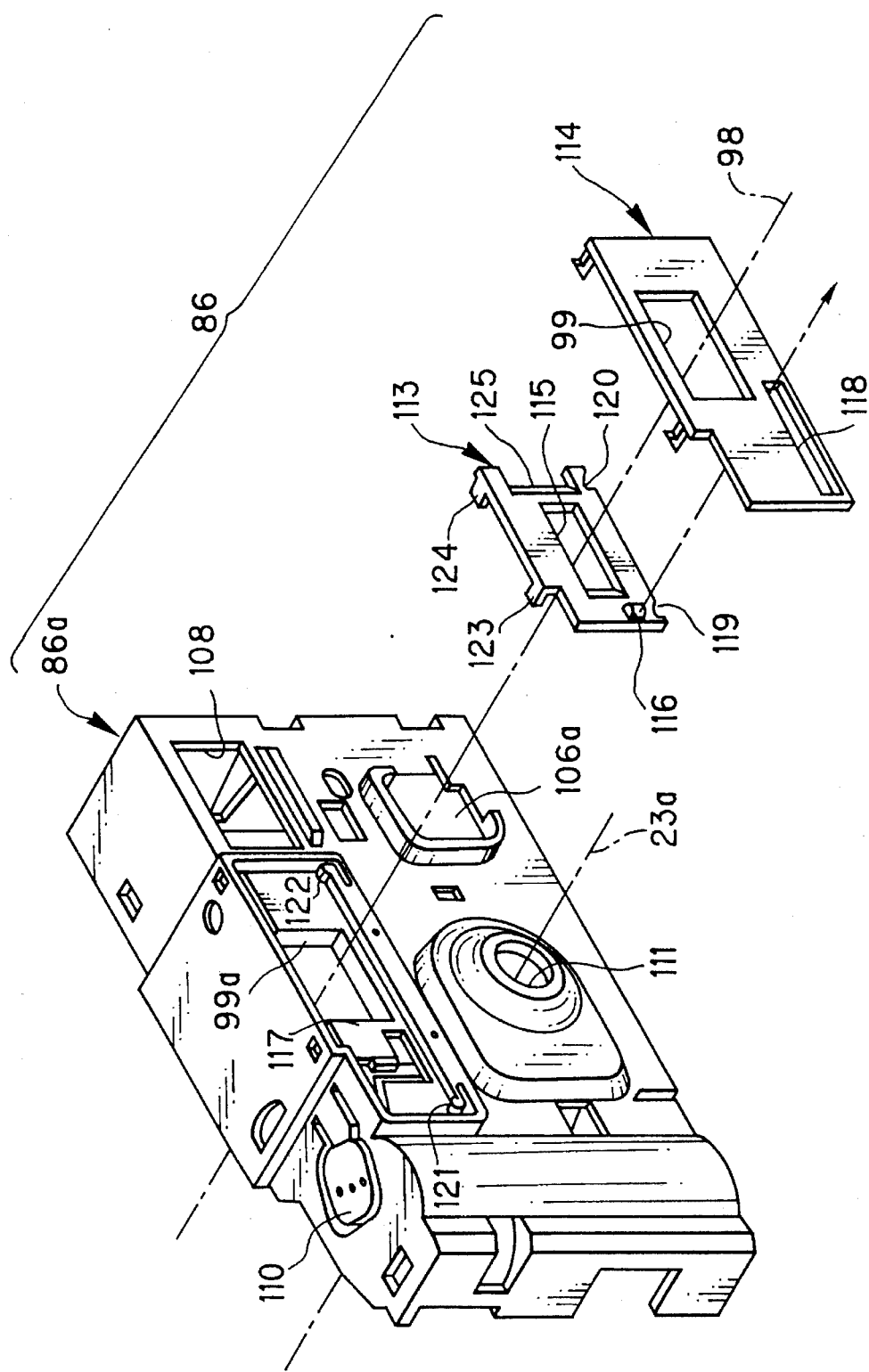
FIGS. 16 and 17 together comprise an exploded perspective view of a film unit according to another embodiment of the invention.
Figure 17:
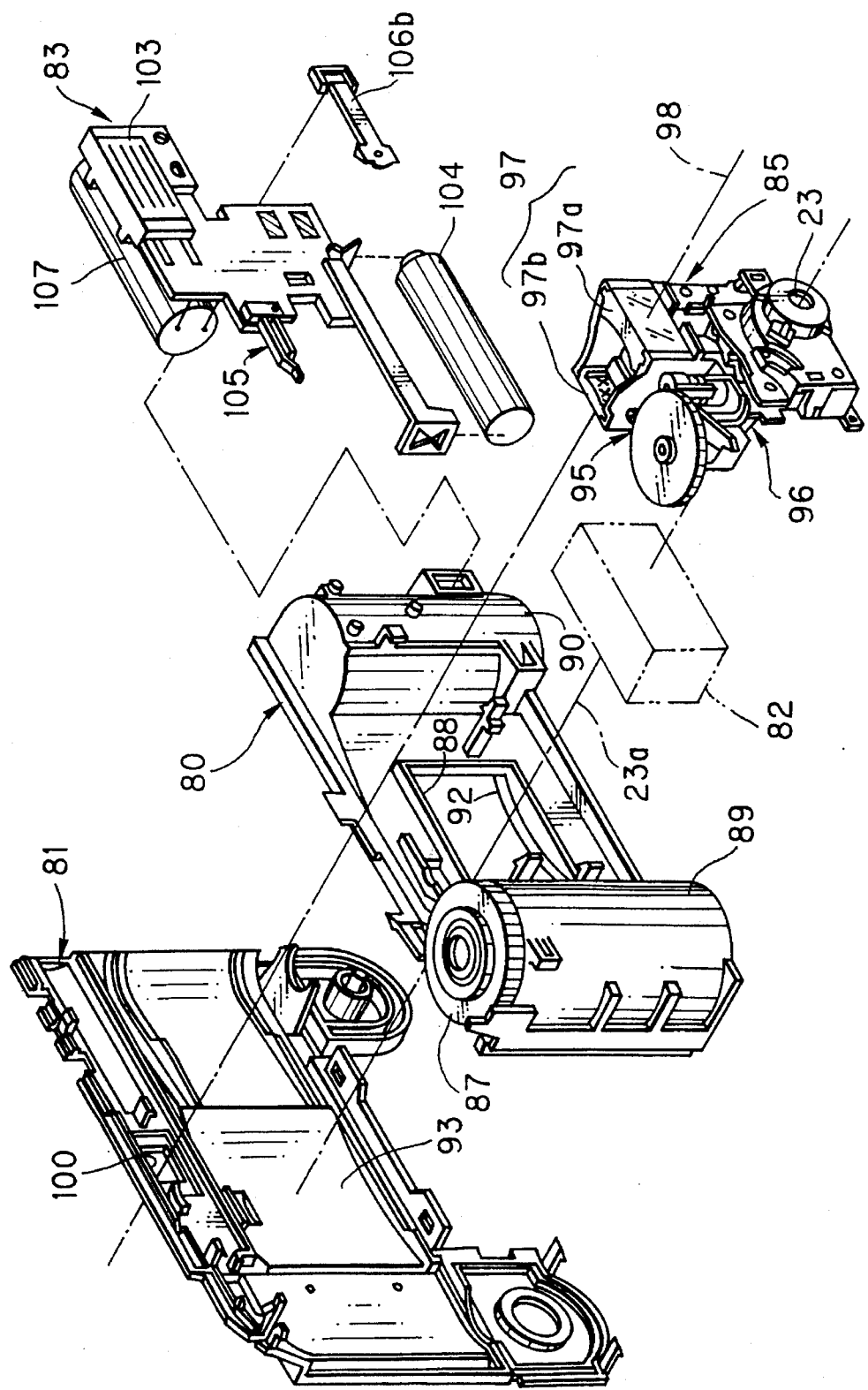
Figure 18:
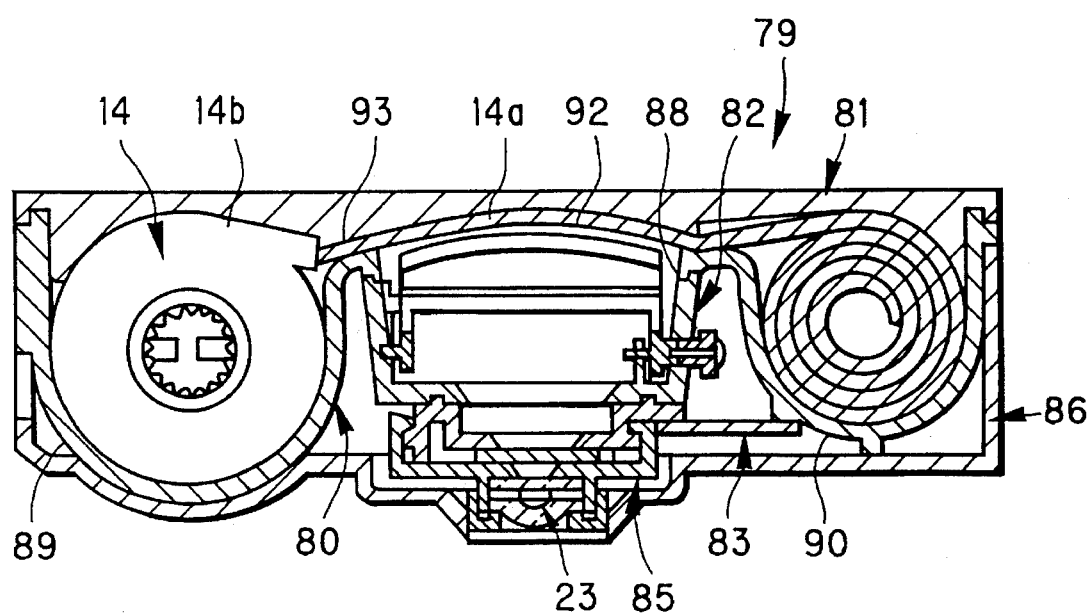
FIG. 18 is a horizontal sectional view of the film unit shown in FIGS. 16 and 17.

FIGS. 16 to 18 show a film unit 79 according to another embodiment of the invention, wherein a main body 80 and a rear cover 81 are removably attached to each other. An exposure aperture size changing unit 82, a flash unit 83 and an exposure unit 85 having a taking lens 84 are removably mounted on the front of the main body 80, and a front cover unit 86 is removably attached to the main body 80 so as to cover the front, top and horizontal sides of the main body 80 and these units. An exposure aperture 88 is formed in the main body 80 in a region behind the taking lens 84. A cassette chamber 89 and a film roll chamber 90 are integrally formed in the main body 80 on opposite horizontal sides of the exposure aperture 88. A film winding wheel 87 is rotatably mounted on the top of the cassette chamber 89. The film roll chamber 90 contains a roll of film 14a pulled out from a cassette housing 14b of a film cassette 14 of ISO 135-type (ISO 1007, 1979), while the cassette chamber 89 contains the cassette housing 14b. The chambers 89 and 90 are light-tightly closed by the rear cover 81. Designated by 84a is an optical axis of the taking lens 84.

The exposure aperture 88 has a size corresponding to a full-size frame of the 135-type film (aspect ratio: 1.5) and has a rearwardly convex contour in a film transporting or horizontal direction. A film support surface 92 is formed on the rear side of the exposure aperture 88 to have the same rearwardly convex contour as the exposure aperture 88. A film pressure surface 93 having a contour complementary to the contour of the film support surface 92 is formed on the front of the rear cover 81 in an area opposite to the film support surface 92. The exposure aperture size changing unit 82 is mounted on the front of the exposure aperture 88, and the exposure unit 85 is mounted on the front of the exposure aperture size change unit 82.

The exposure unit 85 further has an anti-film-advance mechanism 95, a shutter mechanism 96 and an inverted Galilean finder 97 consisting of an objective lens 97a and an ocular 97b, all of which are removably mounted. The viewfinder 97 is disposed between an objective window 99 formed in the front cover unit 86 and an ocular window 100 formed in the rear cover 81. The objective window 99 has such a size that it defines a field of view of the same aspect ratio as the full size frame. Designated by 98 is an optical axis of the optical system 97a and 97b.

The flash unit 83 has a light emitting portion 103, a battery 104, a pair of X-shaped contacts 105, a capacitor 107 and so forth. The capacitor 107 begins to be charged upon depression of a resilient member 106a, which is formed integrally with the front cover unit 86 so as to close a contact 106b (FIG. 17) when depressed. The light emitting portion 33 projects light through a flash window 108 formed in the front cover unit 86 in response to a trigger signal applied through the X-shaped contacts 105. The battery 104 is disposed horizontally below the exposure aperture size changing unit 82. This arrangement contributes to compactness of the film unit 97.

The front cover unit 86 is constituted of a front cover 86a having an opening 99a corresponding to the objective window 99, the flash window 108, a shutter button 110, an exposure aperture 111 and other elements which are integrally formed therewith, and a panoramic finder mask 113 and a cover panel 114 attached to the cover body 86a. The finder mask 113 has a panoramic window 115 which limits the field of view to the same aspect ratio as a panoramic size frame. The finder mask 113 also has a knob 116 which is used for operating the finder mask 113 and changing the exposure aperture size, as set forth later. The objective window 99 is formed through the cover panel 114, and has margins defining the standard size field of view for standard photography. The cover panel 114 also has a slit 118 in which the knob 116 is engaged. Of course, the field of view for standard photography can be defined by the opening 99a, while the objective window 99 is sized to correspond to that field.

The finder mask 113 is slidable on a recessed portion 117 formed in the front wall of the cover body 86a in the film transporting direction between a panoramic position shown in FIG. 16 and a standard position wherein the panoramic window 115 is retracted from the viewfinder 97 perpendicularly to the optical axis 98 thereof. In the standard position, a notch 119 formed in the bottom edge of the finder mask 113 at the left of FIG. 16 is fitted on a click 121 formed at the lower left corner of the recessed portion 117. In the panoramic position, a notch 120 formed in the bottom edge of the finder mask 113 at the right of FIG. 16 is fitted on a click 122 formed at the lower right corner of the recessed portion 117. The finder mask 113 also has a pair of projections 123 and 124 disposed side by side on the top edge thereof and projecting rearward, through which the movement of the finder mask 113 is transmitted to the exposure aperture size changing unit 82. The right edge 125 of the finder mask 113 is cut off so as to minimize the stroke of the finder mask 113 without interfering with the field of view in the standard position.

Figure 19:
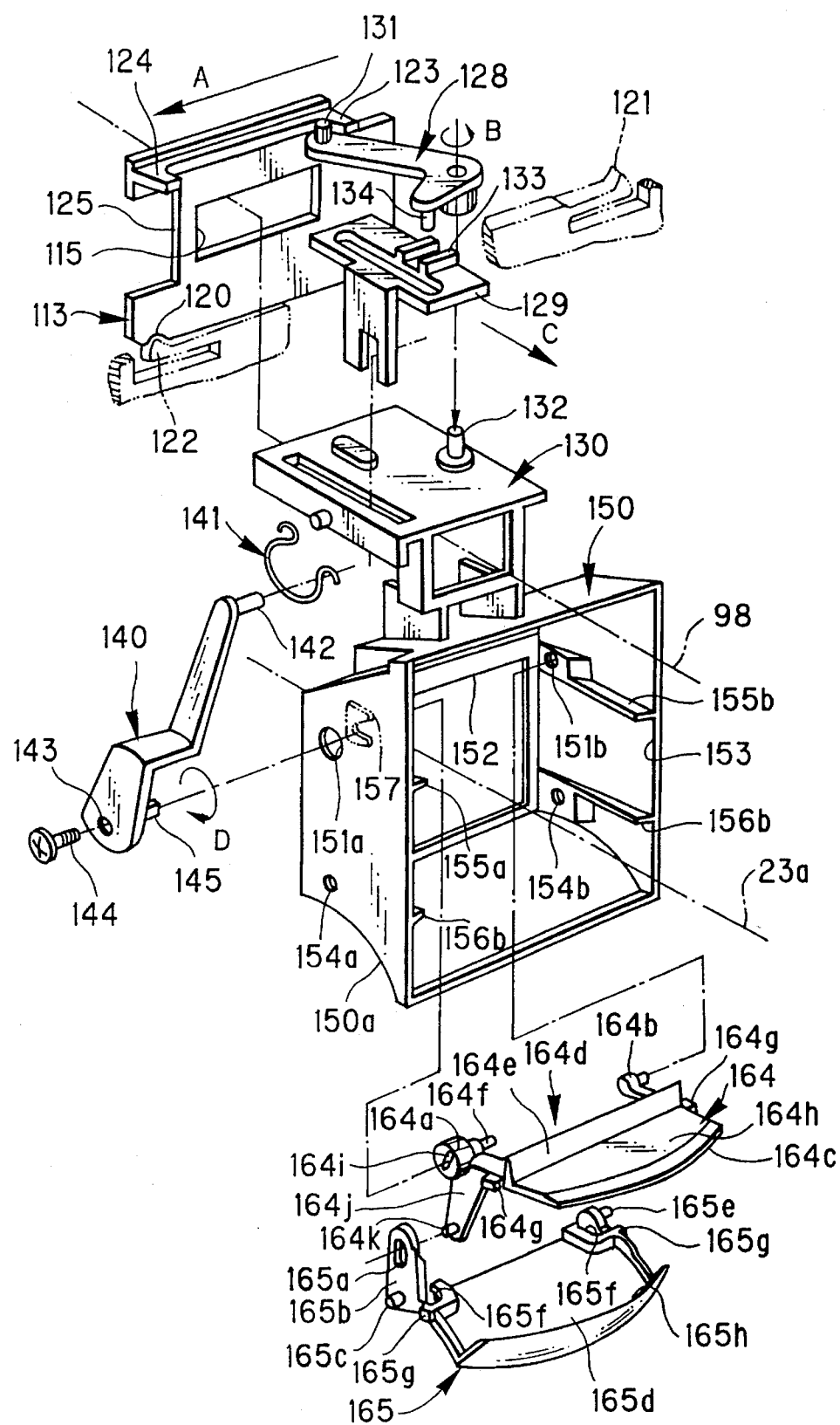
FIG. 19 is an exploded perspective view of an exposure aperture size changing unit of the film unit shown in FIGS. 16 and 17.

FIG. 19 shows the exposure aperture size changing unit 82, which is mainly comprised by a switching lever 128, a slide plate 129, a finder lens holding plate 130, a crank lever 140, a toggle spring 141, an exposure chamber or light-shielding box 150, and upper and lower aperture masking plates 164 and 165. The upper and lower aperture masking plates 164 and 165 are each formed as one body from a resilient material. The switching lever 128 has a pin 131 on one end thereof, which is disposed in the path of the projections 123 and 124. Thereby, the pin 131 may be pushed by either of the projections 123 and 124 to cause the switching lever 128 to rotate about an axle 132 formed on the top wall of the finder lens holding plate 130, when the finder mask 113 moves.

The slide plate 129 has a pair of ridges 133, in which a pin 134 formed on the other end of the switching lever 128 is fitted. The slide plate 129 slides on the holding plate 130 in the direction of the optical axes 84a and 98 in cooperation with the switching lever 128. The slide plate 129 is coupled to the crank lever 140 through engagement between a fork 135 of the slide plate 129 and a pin 142 formed on an upper end of the crank lever 140. The crank lever 140 also has a bearing portion 143 on its lower end. The bearing portion 143 is coupled to the upper aperture masking plate 164 by a screw 144 or the like inserted in a bearing hole 151a of the light-shielding box 150. A coupling peg 145 is formed on the opposite side of the bearing portion 143.

The bottom wall 150a of the light-shielding box 150 is curved complementarily to the contour of the cylindrical battery 104 disposed below, and has front and rear openings 152 and 153 for the passage of exposure light. The rear opening 153 is aligned with the exposure aperture 88. A second bearing hole 151b for bearing the upper aperture masking plate 164 is formed on the opposite side of the light-shielding box 150 from the bearing hole 151a so as to allow pivoting of the upper aperture masking plate 164 about an axis extending in the film transporting direction. Another pair of bearing holes 154a and 154b are formed correspondingly below the bearing holes 151a and 151b, for bearing the lower aperture masking plate 165. Two pairs of stoppers 155a and 155b; 156a and 156b are formed integrally on the inside of the side walls of the light-shielding box 150 so as to position the plates 164 and 165 in the panoramic position.

Figure 20:
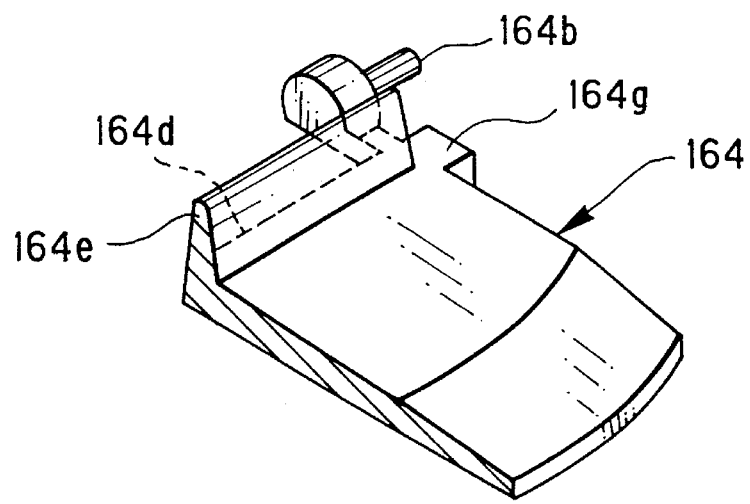
FIG. 20 is a fragmentary perspective view of the upper aperture masking plate shown in FIG. 19.

The upper aperture masking plate 164 has a pair of pivots 164a and 164b on opposite horizontal sides of its front end portion. A rear edge 164c of the upper aperture masking plate 164 has a curve which is complementary to the curve of the film support surface 92. As shown in detail in FIG. 20, a gap 164d is formed between the pivots 164a and 164b, so that the pivots 164a and 164b can be snapped in the bearing holes 151a and 151b by resiliently inwardly deforming the upper aperture masking plate 164. When snapping the first pivot 164a into the bearing hole 151a, a pin 164f of the pivot 164a is engaged with a positioning member 157 formed near the bearing hole 151a, thereby to facilitate positioning of the upper aperture mask plate 164 inside the light-shielding box 150. A blocking wall 164e for blocking light entering through the gap 164d is formed transversely to the main plate portion 164h along the film transporting direction.

The pivot 164a has a slot 164i in which the coupling peg 145 of the crank lever 140 is engaged. Thereby, the upper aperture masking plate 164 is caused by the crank lever 140 to move pivotally between a standard position shown in FIG. 22 and a panoramic position shown in FIG. 23, in cooperation with the slide plate 129 and the finder mask 113. The flap 164 is precisely positioned in the panoramic position, because a pair of lugs 164g formed on opposite horizontal sides of the plate 164 contact the stoppers 155a and 155b under the force of the toggle spring 141. In the standard position, the toggle spring 141 urges the plate 164 into contact with the top wall of the light-shielding box 150. An arm 164j is integrally formed below the first pivot 164a substantially perpendicular to the main flap portion 164h, and a pin 164k is formed at a free end of the arm 164j.

Figure 22:
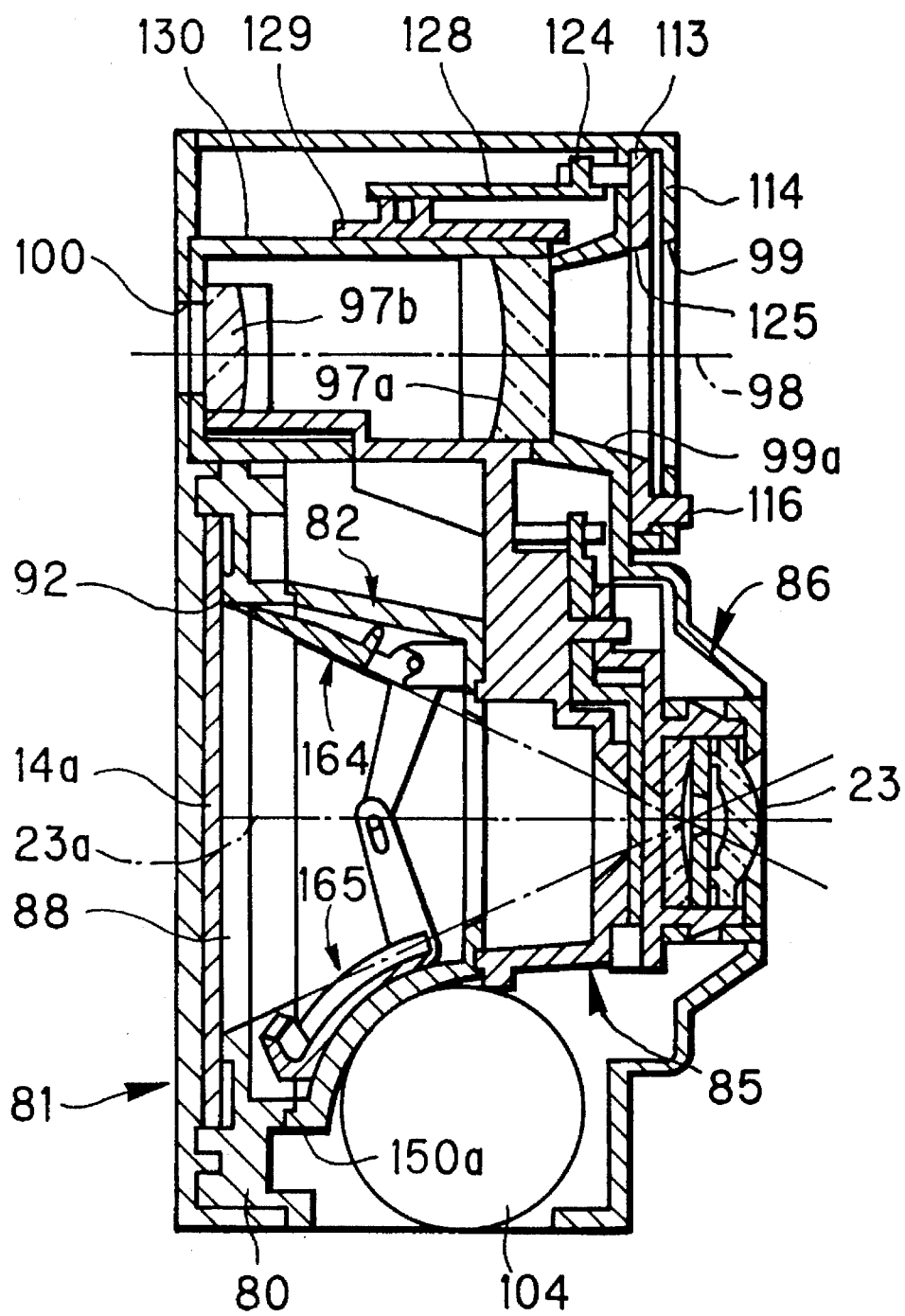
FIG. 22 is a vertical sectional view of the film unit shown in FIG. 18 and illustrates the exposure aperture size changing unit in the standard position.
Figure 23:
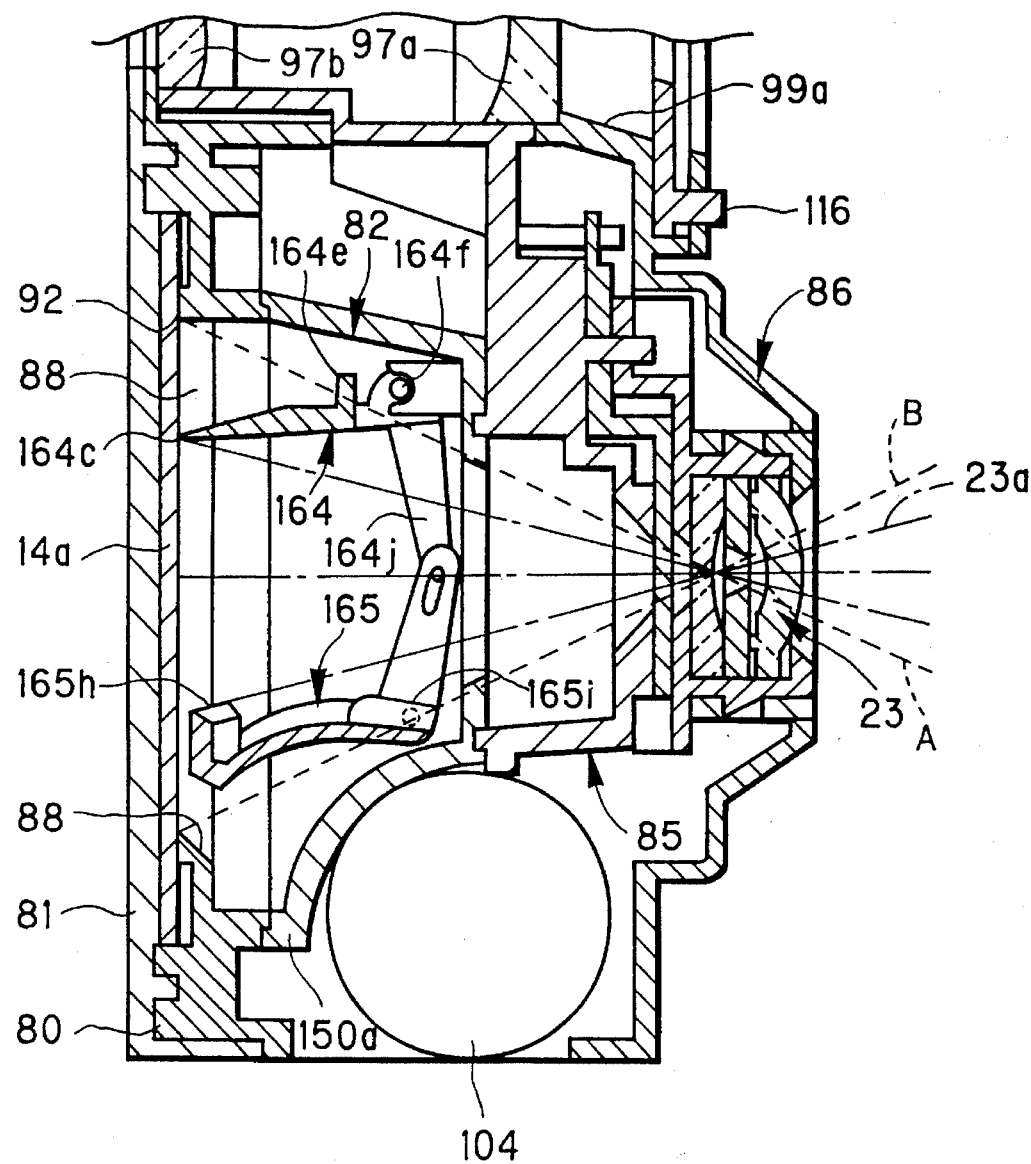
FIG. 23 is a view similar to that of FIG. 22 and illustrates the exposure aperture size changing unit in the panoramic position.

The pin 164k is engaged in a slot 165a formed in an arm 165b of the lower aperture masking plate 165. A pivot 165c is disposed at a joint of the arm 165b to a main plate portion 165d of the lower plate 165. Another pivot 165e is formed on the opposite horizontal side of the lower plate 165 from the pivot 165c in alignment with the film transporting direction. A cut-off 165f is formed inside each of the pivots 165c and 165e so as to permit snapping the same into the respective bearing holes 154a and 154b. In this way, the lower plate 165 can pivot between the standard position and the panoramic position in cooperation with the upper plate 164, as is shown in FIGS. 22 and 23. The lower plate 165 is precisely positioned in the panoramic position because a pair of lugs 165g formed on side edges of the main plate portion 165d contact the stoppers 156a and 156b under the force of the toggle spring 141. In the standard position, the toggle spring 141 urges the flap 165 to contact the bottom wall 150a of the light-shielding box 150.

Figure 21:
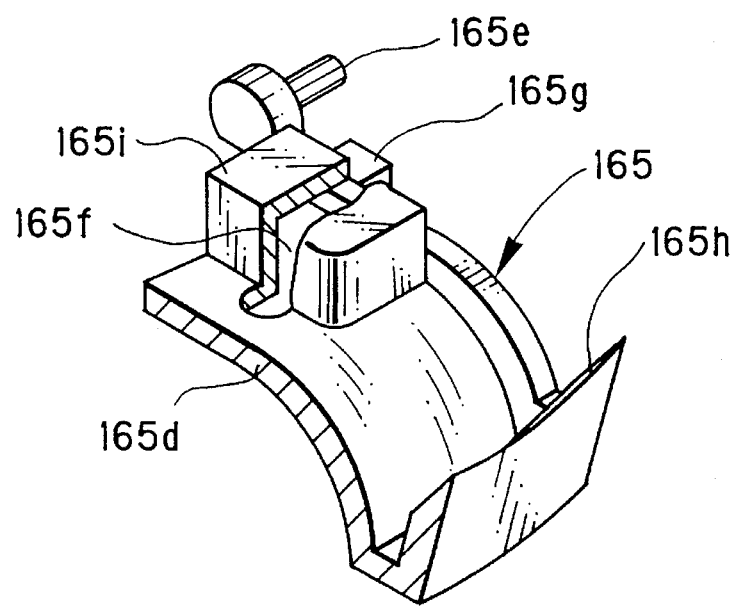
FIG. 21 is a fragmentary perspective view of the lower aperture masking plate shown in FIG. 19.

The main plate portion 165d of the lower aperture masking plate 165 is curved correspondingly to the bottom wall 150a and has a flange 165h which extends along a rear edge rectangularly upwardly from the main plate portion 165d. Because of the curvature of the main plate portion 165d, the inner surface of the lower plate 165 can be displaced farther from the optical path of the exposure light, reflection of the exposure light on the inside surfaces is reduced, and hence the occurrence of flare is minimized. Also the flange 165h is curved correspondingly to the film support surface 92 so as to form a substantially rectangular panoramic picture frame on the photographic film 14a. As shown in FIG. 21, blocking walls 165i are formed to cover the cut-outs 165f for blocking light entering through the cut-outs 165f.

The operation of the embodiment shown in FIGS. 16 to 23 will now be described. When the film 14a has been advanced by one frame by rotating the film winding wheel 87, the anti-film-advance mechanism 95 is automatically activated to lock the wheel 87. Simultaneously, the shutter mechanism 96 is cocked by the one-frame film advance. When the knob 116 is set in the standard position, the panoramic window 115 of the finder mask 113 is retracted from the optical path of the viewfinder 97, so that the standard-size field of view defined by the objective window 99 can be seen through the ocular window 100. Upon depression of the shutter button 110, the shutter mechanism 96 is released to expose the film 14a to light through the exposure aperture 88. Because the upper and lower aperture masking plates 164 and 165 are retracted from the path of the exposure light in the standard position of the film unit 97, the whole portion of the film 14a bounded by the exposure aperture 88 is exposed. Thereby, a full-size picture frame is recorded on the film 14a.

When taking a panoramic photograph, the knob 116 is slid along the slot 188 of the cover panel 114 in a direction shown by an arrow A in FIG. 19, thereby moving the finder mask 113 in this direction A until the notch 120 is caught on the click 122. By virtue of the toggle spring 141, the knob 116 can be slid more smoothly along the last half of this path. The photographer knows by the click that the film unit 97 has been switched to the panoramic position. Simultaneously, the panoramic window 115 is placed in the objective window 99 coaxially with the finder optical axis 98.

The movement of the finder mask 113 in the direction A causes the switching lever 128 to rotate about the axle 132 in a direction shown by an arrow B, and the slide plate 129 slides in a direction shown by an arrow C in cooperation with that rotation of the switching lever 128. Thereby, the crank lever 140 is rotated in a direction shown by an arrow D, placing the upper and lower aperture masking plates 164 and 165 in the panoramic position shown in FIG. 23. Because the field of view is defined by the panoramic window 115 at that time, the photographer can frame the photographic field in the panoramic size.

When the shutter mechanism 96 is released in this position, the upper and lower aperture masking plates 164 and 165 cut off upper and lower parts of the light entering the taking lens 84, so that a remaining part of the light exposes the film 14a. As a result, a panoramic-size picture frame is recorded on the film 14a, while the blocking walls 164e and 165i prevent the picture frame from being affected by extraneous light entering through the gap 164d or the cut-outs 165f, that is, light shown by dashed lines A and B.

In this way, standard photography or panoramic photography can be selected by operating the knob 116. After all available picture frames are exposed, the film unit 97 is forwarded to a photo-finisher to be processed in the manner as set forth above.

Figure 24:
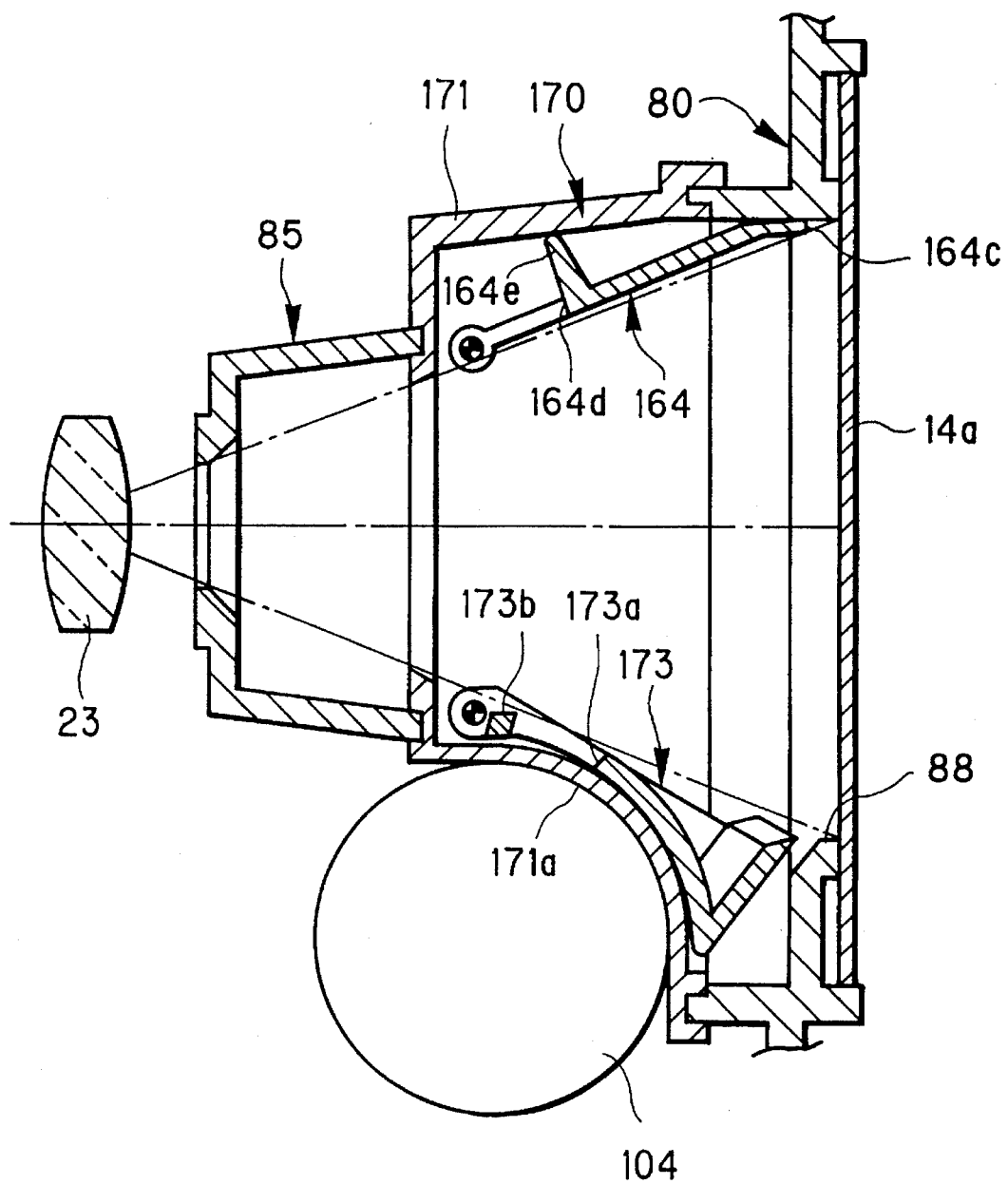
FIG. 24 is an explanatory view illustrating an exposure aperture size changing unit according to another embodiment of the invention, in the standard position.
Figure 25:
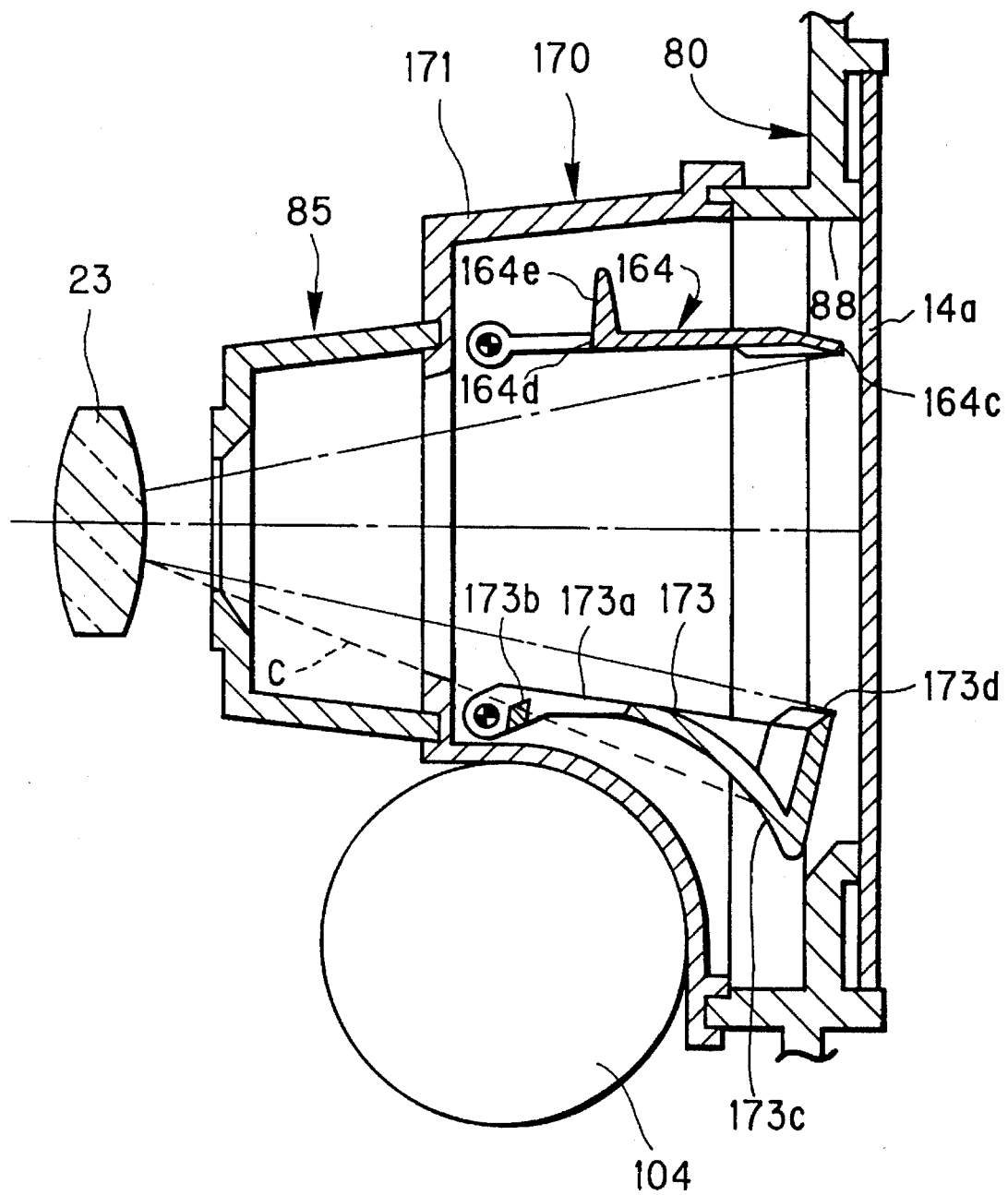
FIG. 25 is a view similar to that of FIG. 24 and illustrates the parts in the panoramic position.
Figure 26:
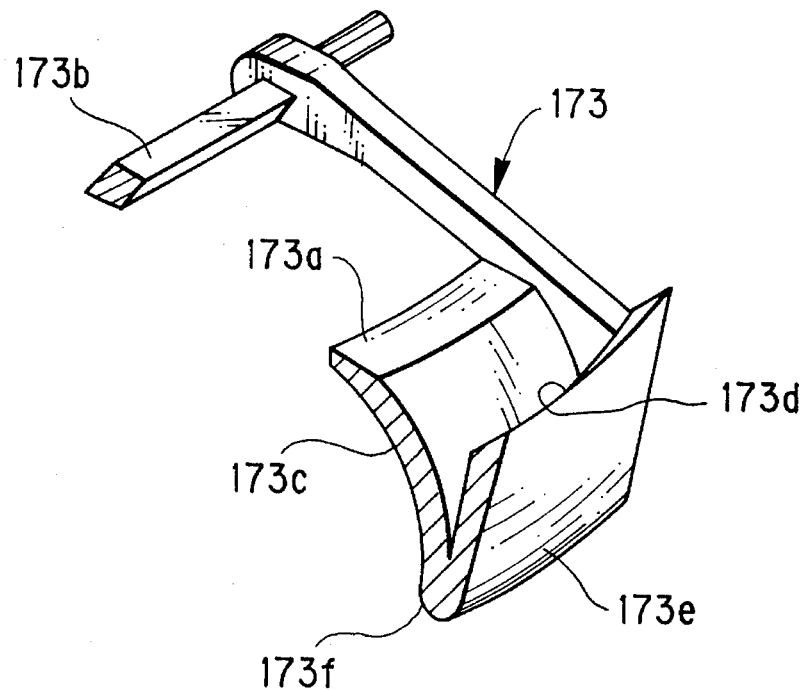
FIG. 26 is a fragmentary perspective view of the lower aperture masking plate shown in FIGS. 24 and 25.

FIGS. 24 and 25 show an exposure aperture size changing unit 170 which makes the film unit more compact and thinner. A bottom wall 171a of a light-shielding box 171 of the exposure aperture size changing unit 170 is curved complementarily to the periphery of the battery 104 as far as possible; otherwise, the bottom wall 171a would interfere with the exposure light. Therefore, as shown in detail in FIG. 26, a lower aperture masking plate 173 has a cut-out 173a in a middle portion thereof so as to cut down the peak of the convex inner surface of the plate 173. Thereby, the lower plate 173 can be sufficiently retracted from the path of the exposure light in the standard position shown in FIG. 24, in spite of the reduced space for retraction inside the light-shielding box 171.

A blocking wall 173b for blocking light from entering through the cut-outs 173a is formed integrally with the lower plate 173. Furthermore, an elbow 173f connecting a curved main plate portion 173c to a flange 173e of the lower plate 173 is elongated downward so as to block light component C entering through the cut-out 173a from the exposure aperture 88 in the panoramic position shown in FIG. 25, in combination with the blocking wall 173b.

Figure 27:
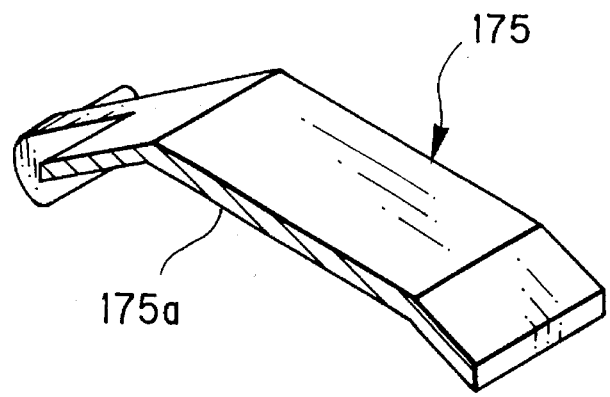
FIG. 27 is a fragmentary perspective view of an upper aperture masking plate according to another embodiment of the invention.
Figure 28:
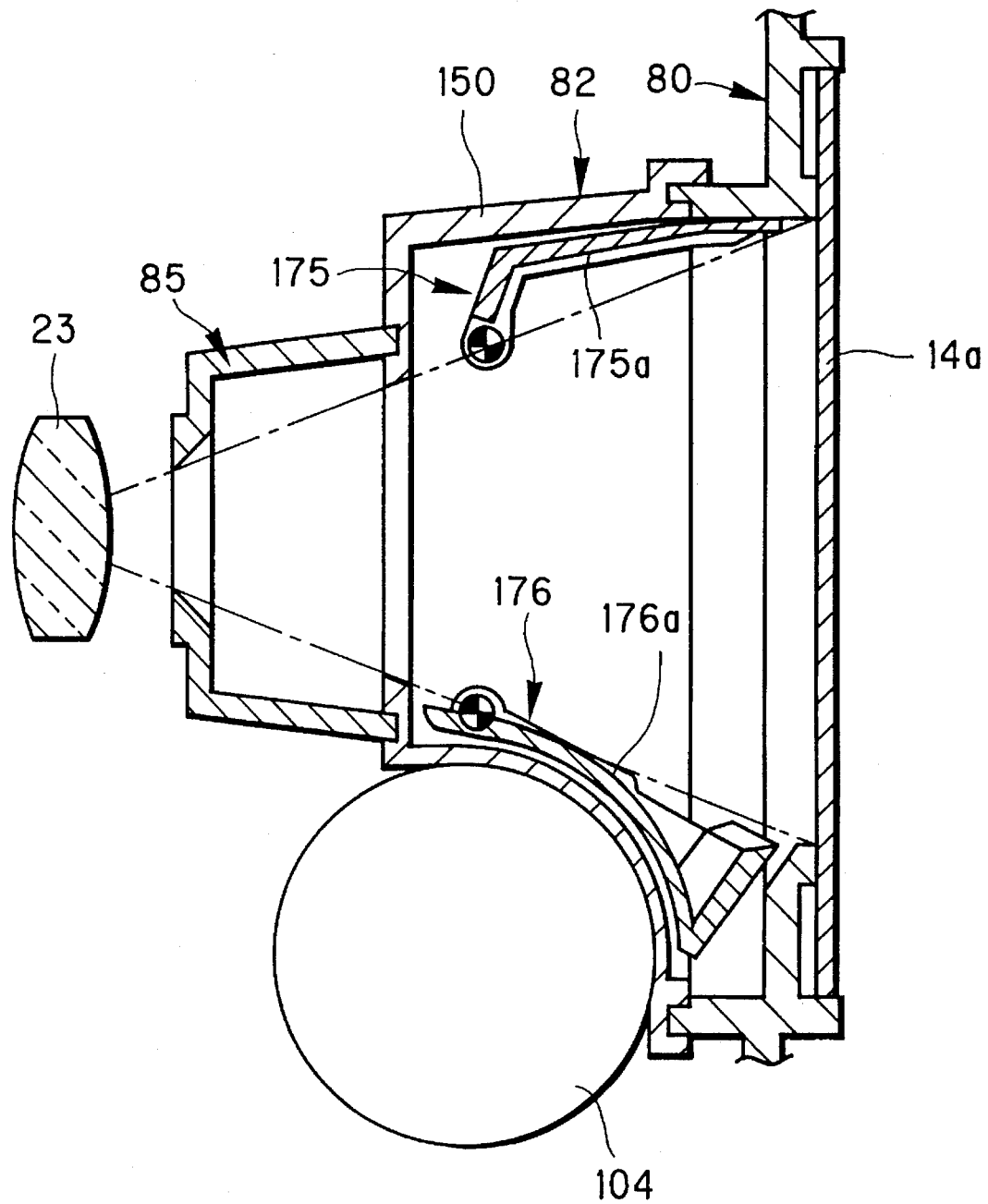
FIG. 28 is an explanatory view illustrating an exposure aperture size changing unit in the standard position, which uses the upper aperture masking plate shown in FIG. 27.
Figure 29:
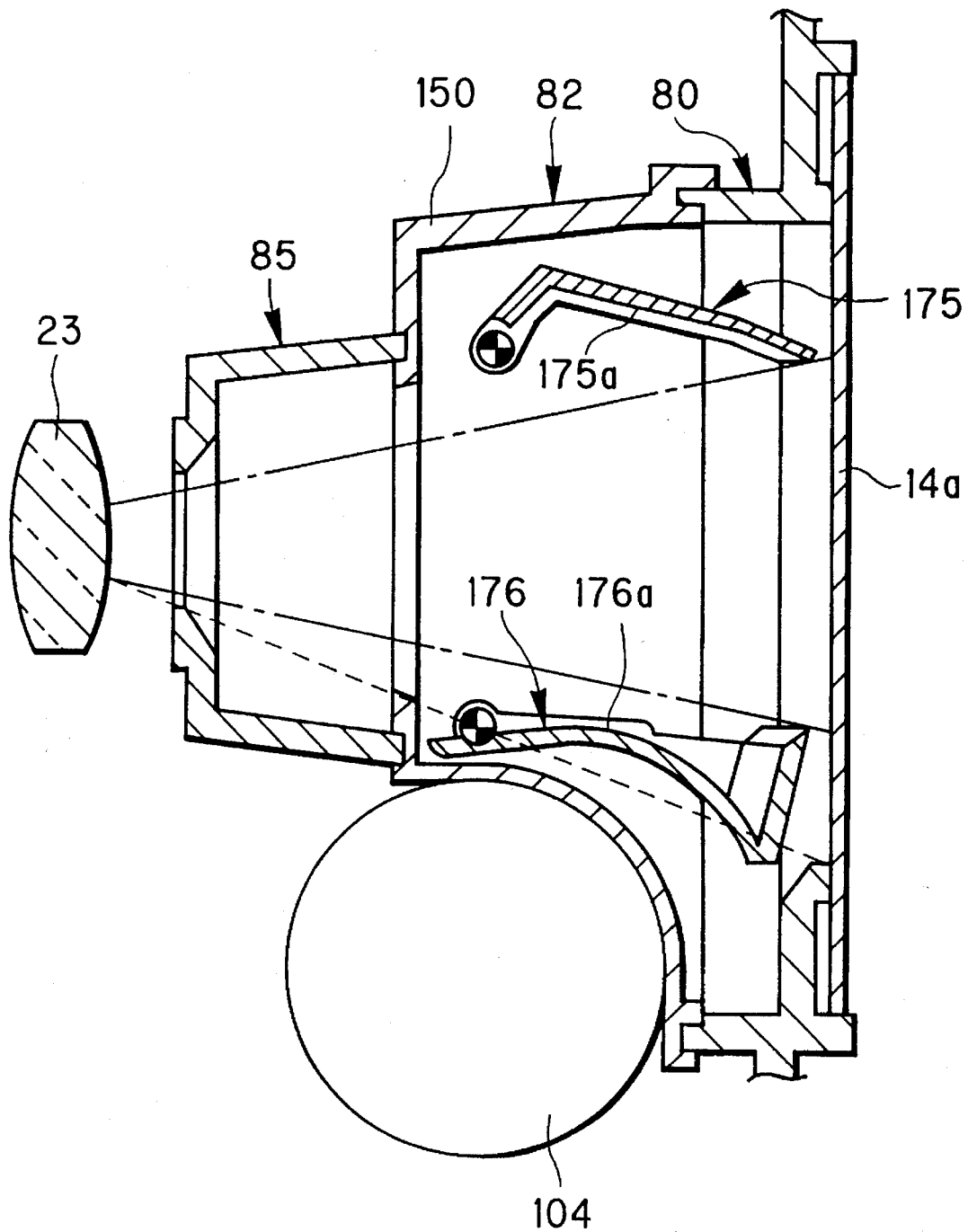
FIG. 29 is a view similar to that of FIG. 28 and illustrates the parts in the panoramic position.

FIG. 27 shows an upper aperture masking plate 175 according to another embodiment, which has an inwardly concave inner surface 175a. Thereby, the inner surface 175a is sufficiently retracted from the path of the exposure light, as is shown in FIGS. 28 and 29, reducing reflection and flares. Also a lower plate 176 is curved for reducing reflection of the exposure light on an inner surface 176a thereof. Needless to say, FIG. 28 shows the standard position, whereas FIG. 29 shows the panoramic position.

Figure 30:
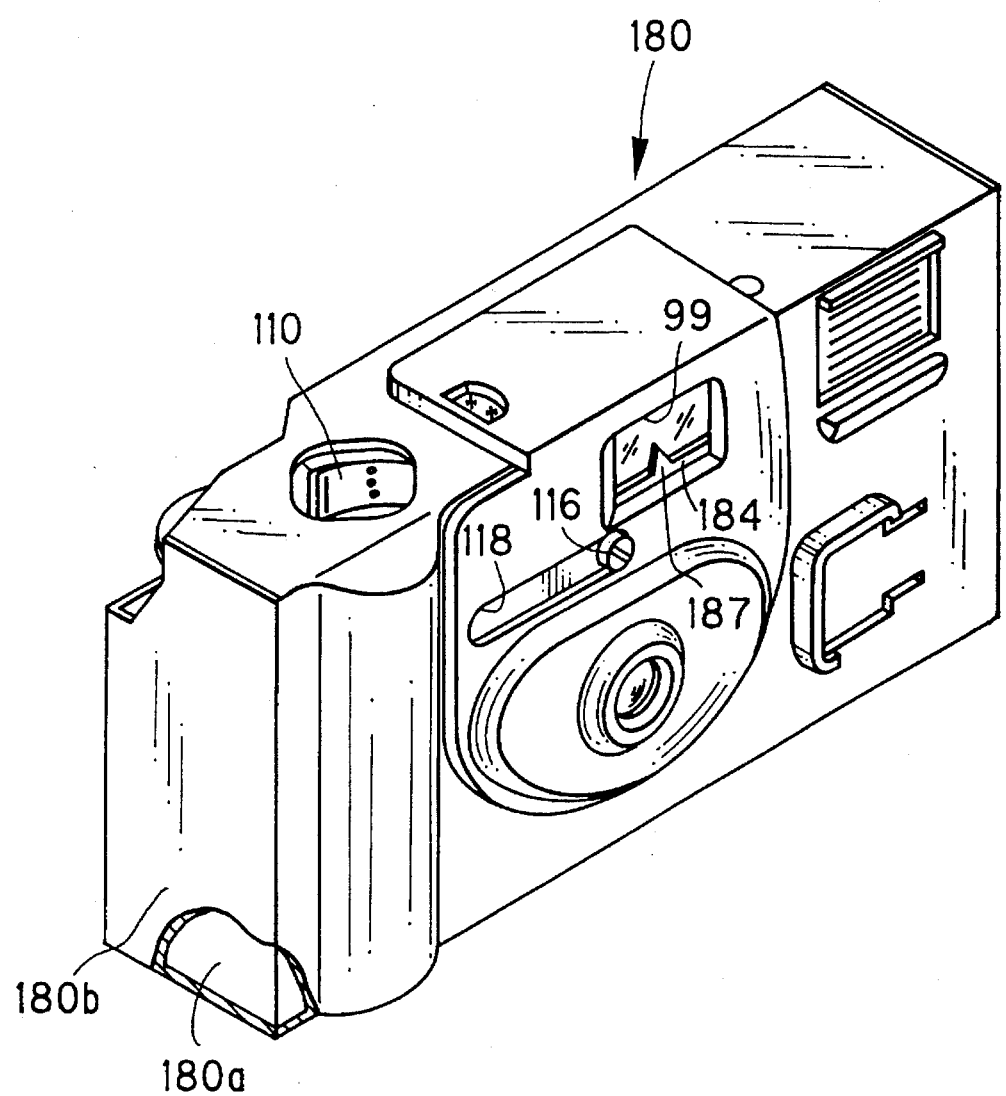
FIG. 30 is a perspective view of a film unit according to another embodiment of the invention.

FIGS. 30 to 36 illustrate another embodiment of the lens-fitted film unit. Elements similar to those of the embodiment shown in FIGS. 16 to 19 are represented by using identical reference numerals. As is shown in FIG. 30, a lens-fitted film unit 180 is comprised by a film housing 180a and a cardboard box 180b, and covered with a wrapping while set to the panoramic photography mode like the first embodiment. For panoramic photography, a photography mode changing knob 116 is set to the panoramic position which is at the leftmost end of a slot 118. A panoramic finder mask 184 partially masks a finder objective window 99.

Figure 31:
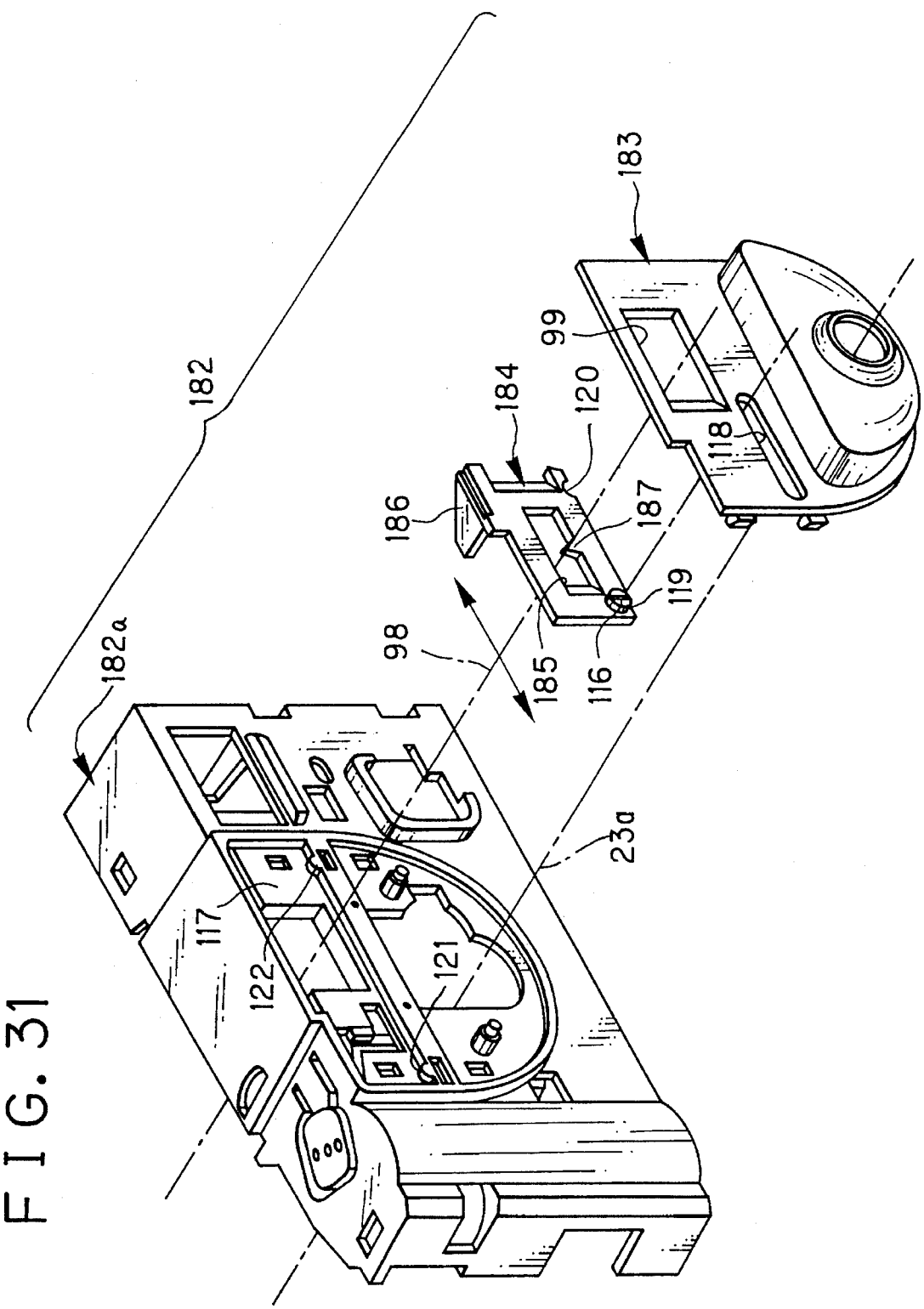
FIGS. 31 and 32 together comprise an exploded perspective view of the film unit shown in FIG. 30.
Figure 32:
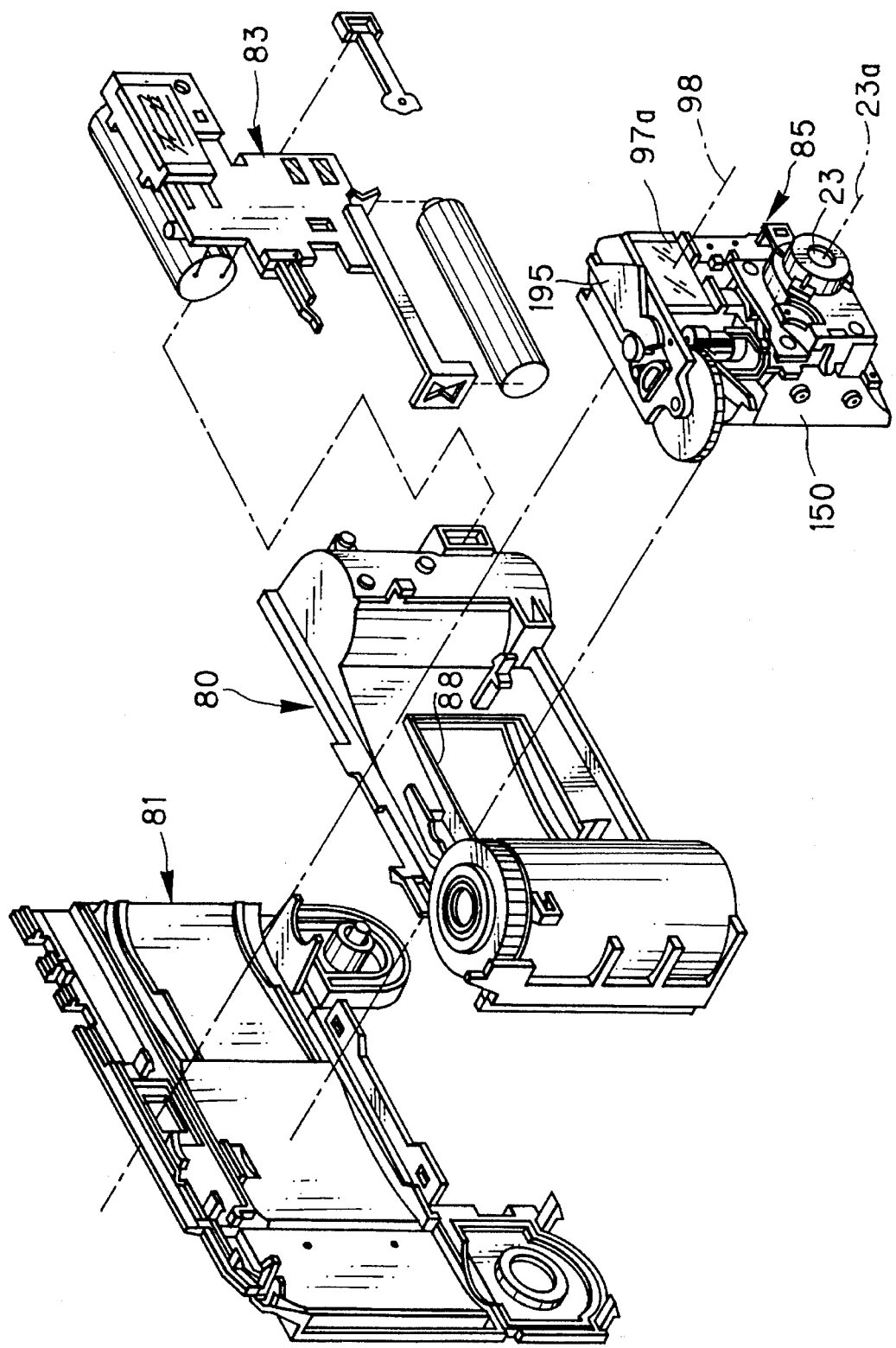
Figure 33:
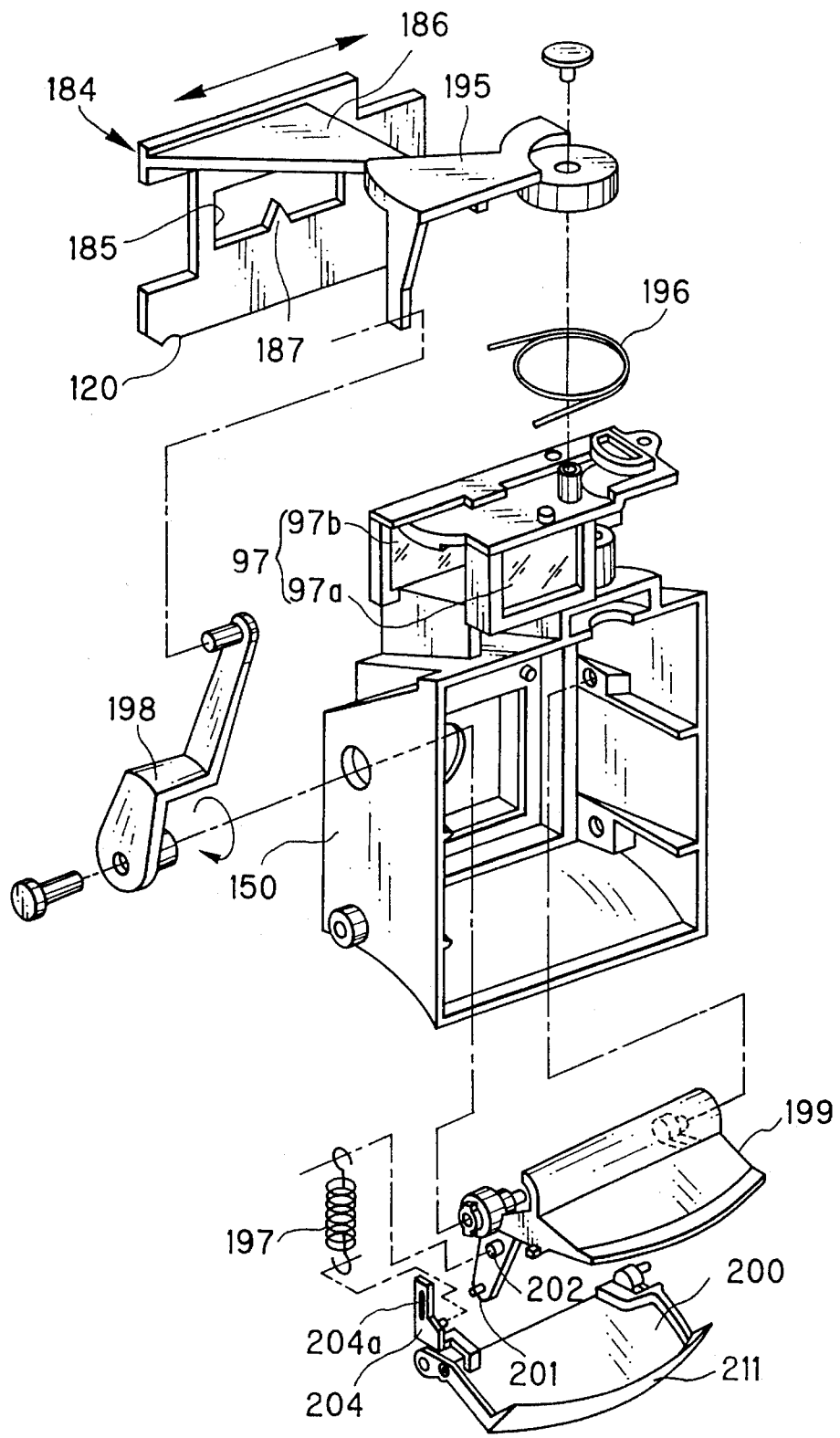
FIG. 33 is an exploded perspective view of an exposure aperture size changing unit of the film unit shown in FIG. 30.

Referring to FIGS. 31 and 32, the film housing 180a is constituted by a main body 80, a rear cover 81, a front cover unit 182, a flash unit 83, and an exposure unit 85. The exposure unit 85 is integral with a finder 97 having an objective lens 97a and an eyepiece lens 97b (FIG. 33). Reference numerals 23a and 98 represent the optical axis of a taking lens 23 and a finder optical axis, respectively.

The front cover unit 182 has a front cover 182a, a cover panel 183 snap-coupled on the front of the front cover 182a, and a panoramic finder mask 184 interposed therebetween. The panoramic finder mask 184 is integrally formed with a panoramic opening 185 defining a panoramic-size field of view, the photography mode changing knob 116, a pair of notches 119 and 120, a cam plate 186, and a triangular mark 187 indicating the center of the panoramic-size field of view. Formed in the front cover 182a is a recess for housing the panoramic finder mask 184 slidably in the directions of a two-head arrow. A pair of click claws 121 and 122 are formed at opposite lower ends of the recess 117. The cover panel 183 is integrally formed with a finder objective window 99 and the slot 118 through which the photography mode changing knob 116 extends outside the camera.

As the photography mode changing knob 116 is slid along the slot 118 to the right, the panoramic finder mask 184 is moved from the full-size position to the panoramic position. In the full-size position, the click claw 121 is snap-coupled in the notch 119 so that the panoramic opening 185 retracts from the finder objective window 99 to form the full-size field of view. In the panoramic position, the click claw 122 is snap-coupled in the notch 120 so that the panoramic opening 185 is located in front of the finder objective window 99 to form the panoramic size field of view.

As shown in FIG. 33, midway along the path of movement of the panoramic finder mask 184 toward the panoramic position, the cam plate 186 pushes an intermediate lever 195 mounted on the upper portion of the finder unit 97. As a result, the intermediate lever 195 rotates in the counterclockwise direction against the force of a spring 196 so that a crank lever 198 rotatably mounted in the side wall of a light shielding box 150 rotates in the clockwise direction.

In the light shielding box 150, an upper aperture masking plate 199 and a lower aperture masking plate 200 are rotatably mounted on parallel shafts. An arm 202 with a pin 201 formed at the distal end portion is mounted on the upper aperture masking plate 199. An arm 204 with an elongated hole 204a in which the pin 201 is inserted is mounted on the lower aperture masking plate 200. A spring 197 extends between the arms 202 and 204 to urge the aperture masks 199 and 200 in the direction of opening them. This spring 197 also urges the panoramic finder mask 184 to the full-size position via the crank lever 198 and cam plate 186.

The crank lever 198 is coaxially mounted on the shaft of the upper aperture masking plate 199. Therefore, as the crank lever 198 rotates in the clockwise direction, the upper aperture masking plate 199 swings from the full-size position (retracted position) shown in FIG. 35 to the panoramic position (inserted position) shown in FIG. 34, against the force of the spring 197. The lower aperture masking plate 200 also swings to the panoramic position following the movement of the upper aperture masking plate 199.

Figure 34:
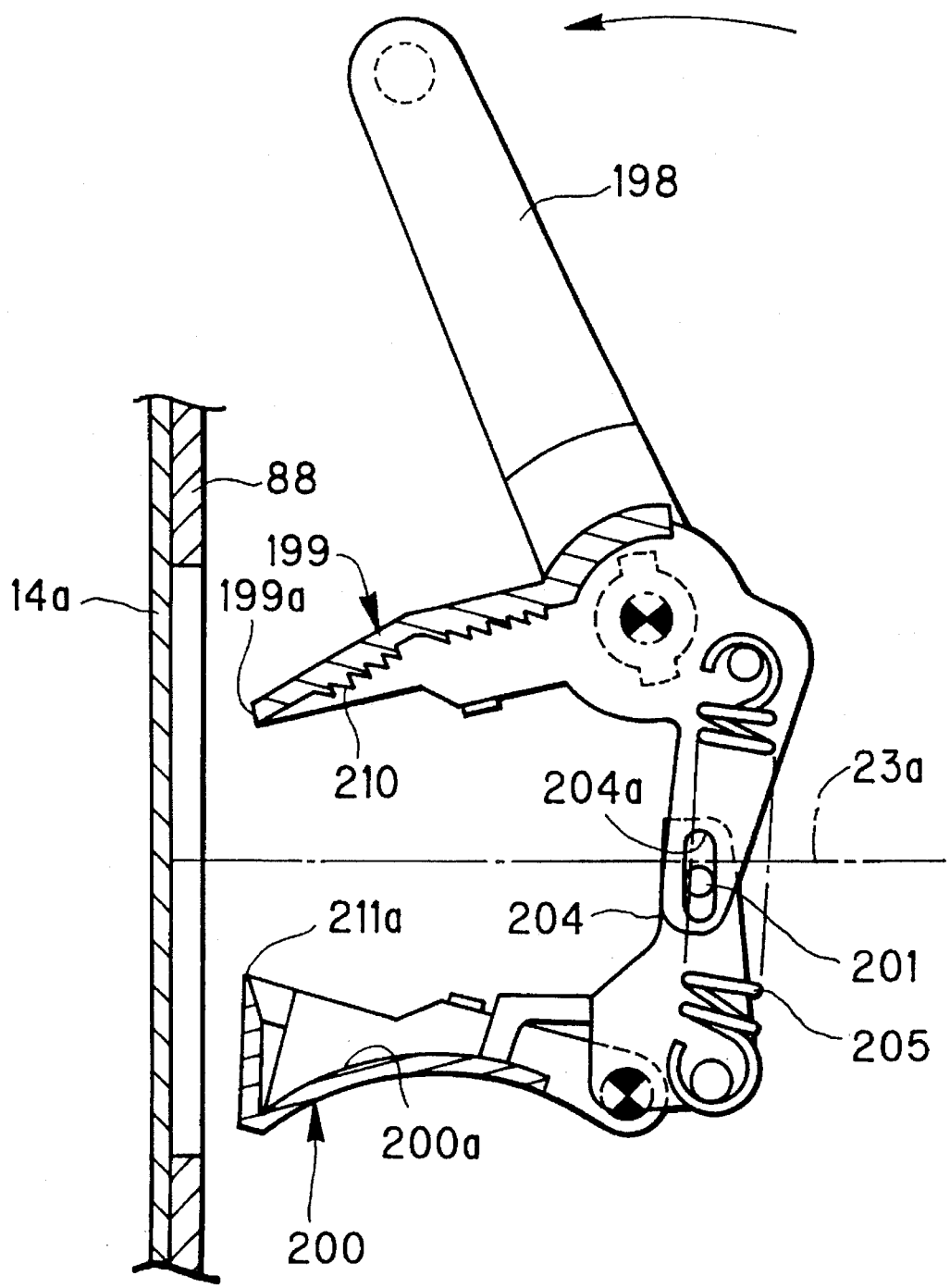
FIG. 34 is a diagram illustrating panoramic-size photography with the embodiment of FIGS. 30–33.
Figure 35:
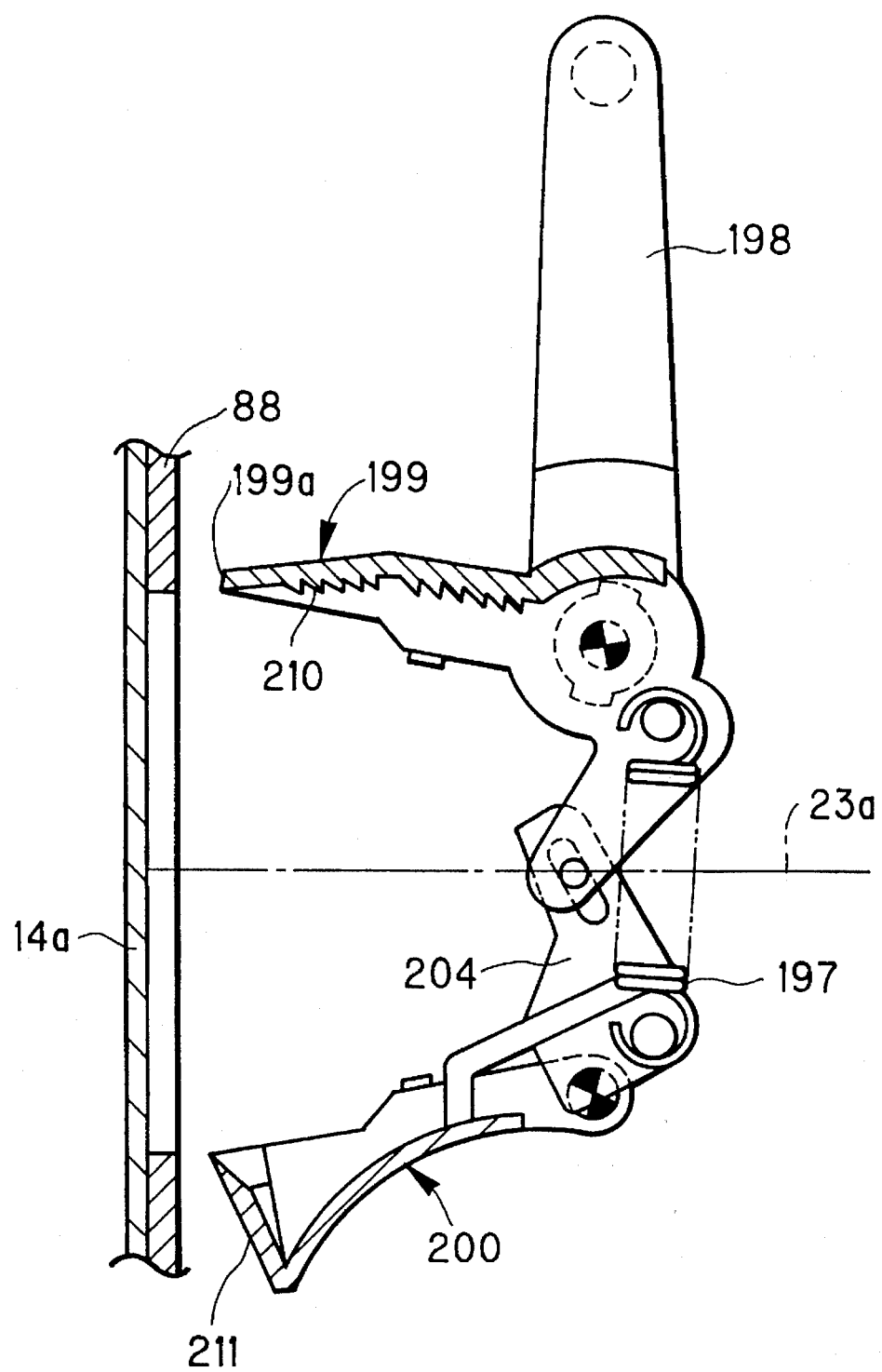
FIG. 35 is a diagram illustrating full-size photography therewith.

As shown in FIGS. 34 and 35, a plurality of light shielding grooves 210 having a sawtooth shape in section are formed on the upper aperture masking plate 199 in a direction parallel to the film advancing direction to prevent light from being internally reflected. A curved surface 200a matching the curvature of the bottom of the light shielding box 150 and an edge plate 211 of L-shape are formed on the lower aperture masking plate 200 to prevent flare caused by internal reflection.

Also in this embodiment, the photographic film 14a is curved in the exposure station and the aperture masking plates 199 and 200 are spaced from the photographic film 14a, so that the upper and lower sides of the picture frame are curved. For this reason, the distal edge 199*a* of the upper aperture masking plate 199 and the distal edge 211*a* of the lower aperture masking plate 200 are curved and extend outwardly at the central area to match the curvature of the photographic film 14*a*.

Similarly to the first embodiment, the film unit 180 covered with a wrapping is set to the panoramic photography mode. In the panoramic photography mode, the click claw 122 is fitted in the notch 120 and the panoramic opening 185 is coincident with the finder objective window 99. As shown in FIG. 18, the finder provides a laterally elongated panoramic size field of view having a vertical/horizontal ratio of 1:2.8. The aperture masking plates 199 and 200 are set to the panoramic position shown in FIG. 33, and the frame size is set to the panoramic size.

Similarly to the first embodiment, after winding the film, a user viewing a scene through the finder will know without fail that the film unit is of full-size photography and panoramic size photography selectively changeable type. If panoramic photography is to be performed, the position of a main subject is framed while referring to the image 187*a* of the triangular mark 187 at the center of the panoramic-size field of view 215. Next, the shutter release button 61 is depressed to form a panoramic-size frame on the photographic film 14*a*. In this case, the upper and lower sides of the panoramic-size frame are straight parallel lines because the edges of the aperture masking plates 199 and 200 are curved.

If full-size photography is to be performed, the photography mode changing knob 116 is slid to the left from the panoramic position shown in FIG. 30 to the full-size position. First, the snap coupling between the notch 120 and a click claw 122 is released so that the panoramic finder mask 184 moves to the left in the recess 117. With this movement, the pressure on the intermediate lever 195 from the cam plate 186 is released so that the intermediate lever 195 rotates in the clockwise direction as viewed in FIG. 33 against the forces of the springs 196 and 197. As the intermediate lever 195 rotates, the pressure on the crank lever 198 from the intermediate lever 195 is released so that the crank lever 198 rotates in the counterclockwise direction under the force of the spring 197 following the movement of the intermediate lever 195. As the crank lever 198 rotates, the aperture masking plates 199 and 200 are swung to the full-size position, not intercepting light, as shown in FIG. 35.

As the photography mode changing knob 116 is further slid to retract the panoramic finder mask 184 from the finder objective window 99, the click claw 121 engages in the notch 119 and the sliding movement is stopped. In this condition, the panoramic finder mask 184 is completely hidden behind the cover panel 183.

Figure 36:
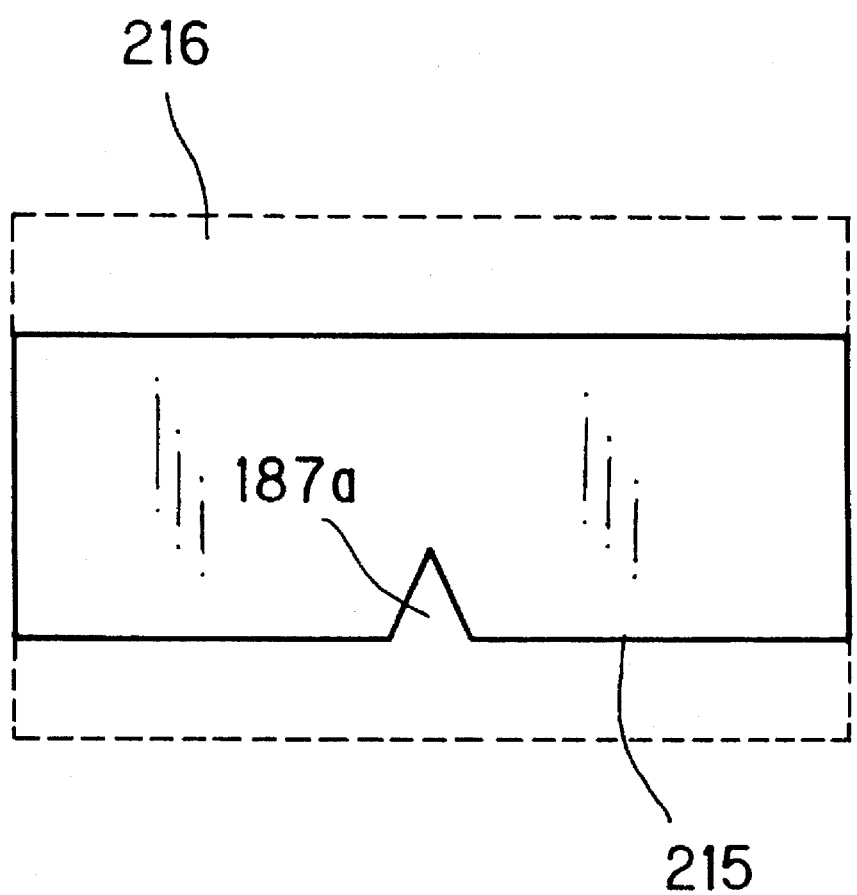
FIG. 36 is a diagram illustrating the finder view field of the embodiment of FIGS. 30–35.

In the full-size photography mode, as indicated by broken lines in FIGS. 36, a full-size field of view 216 with a vertical/horizontal ratio of 2:3 can be observed. When the release button is depressed, the image of a subject is formed as a full-size frame on the photographic film 14*a*.

Photography continues thereafter by setting the photography mode changing knob 116 before or after the film winding to select either the full-size photography mode or the panoramic-size photography mode. In switching from the full-size photography mode to the panoramic photography mode, the photography mode changing knob 116 is set to the position shown in FIG. 30. In this case, the components move in the directions opposite to those when switched from the panoramic-size photography mode to the full-size photography mode described above, the panoramic photography mode having again been set at the factory before wrapping the film unit 180. Also in this embodiment, indicia are printed on the photographic film cassette preloaded in the film housing 180*a* indicating that the photographic film includes both full-size frames and panoramic-size frames, so that this film can be assigned to the proper group of exposed films for groupwise development, as described above.

Figure 37:
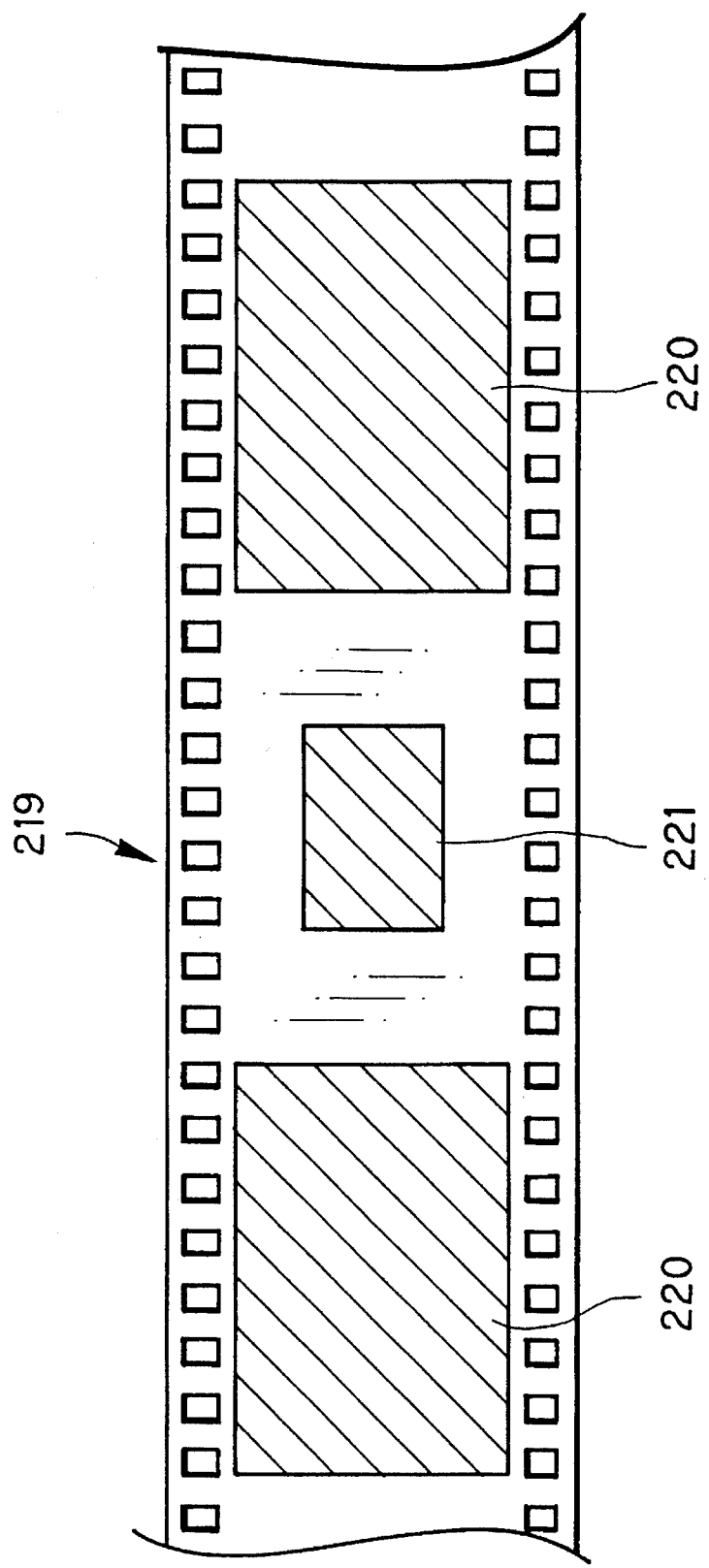
FIG. 37 is a diagram showing a photographic film exposed in the full-size photography mode and in a pseudo-telephotography mode.

In the above embodiments, a pair of aperture masking plates has been retracted from, or inserted into, the upper and lower areas of the exposure aperture. Another pair of aperture masking plates may be used to mask the right and left areas of the exposure aperture, thereby to perform a pseudo-telephotography. In this case, as shown in FIG. 37, full-size frames 220 and pseudo-telephoto size frames 221 can be formed on the same photographic film 219. The pseudo-telephoto-size frame has the same aspect ratio as the full-size frame 220, but has an area ratio of ¼. When printing a pseudo-telephone size frame 221, the print magnification factor is set large to make a photoprint having the same size as a standard photoprint.

For the film unit of a full-size photography and pseudo-telephotography changeable type, a pseudo-telephoto field of view frame (not shown) having an area one fourth that of the full-size field of view is used in place of the panoramic finder mask 184. In order to ensure a reliable grouping of exposed films in a laboratory, indicia are added to the photographic film cassette preloaded in the film housing, indicating that the photographic film contains both full-size frames and pseudo-telephoto-size frames. The film unit is covered with a wrapping while set to the pseudo-telephotography mode, and indicia that both pseudo-telephotography and full-size photography are possible are printed on the wrapping.

A special size frame includes not only the panoramic size and pseudo-telephoto size described above, but also a wide-vision size (aspect ratio 1.78), a cinema size (aspect ratio 2.30), a square size (aspect ratio 1.0) and the like. Or it may be possible to change between the panoramic size and the wide-vision size. Therefore, the present invention is applicable for changing between a large frame size and a small frame size.

The exposure aperture size change device of the present invention is applicable not only to a single-use film unit but also to a compact camera capable of repeated film loading or the like.

While the present invention has been described with reference to the preferred embodiments shown in the drawings, the invention should not be limited by the embodiments but, on the contrary, various modifications, changes, combinations and the like of the present invention can be effected without departing from the spirit and scope of the appended claims.

What is claimed is:

1. In a lens-fitted photographic film unit having photographic film loaded therein and having a forwardly concave film surface behind an exposure aperture formed in an exposure frame so as to correct distortion by a taking lens, said film surface being adapted to be exposed to light entering through said taking lens and said exposure aperture, said lens-fitted photographic film unit comprising:

a photographic mode changing means which is manually actuable for selecting either a standard photography mode for forming a standard size picture frame on said film surface or a special photography mode in which a special size picture frame smaller than said standard size picture frame may be formed; and first and second aperture masking plates disposed in front of said exposure frame, said aperture masking plates being adapted to be set in a special photography position for masking out parts of said exposure aperture when said special photography mode is selected;

the improvement wherein said aperture masking plates have such shapes that, if images of said aperture masking plates are projected onto a plane perpendicular to an optical axis of said taking lens in said special photography position, said images have convexly curved top and bottom margins adjacent each other.

2. A lens-fitted photographic film unit as recited in claim 1, wherein said aperture masking plates cooperate with said changing means through an interconnecting mechanism.

3. A lens-fitted photographic film unit as recited in claim 2, wherein said aperture masking plates cooperate with each other so as to move in opposite directions.

4. A lens-fitted photographic film unit as recited in claim 1, further comprising a finder masking member for masking out a field of view of a viewfinder in correspondence with said special size picture frame when said special photography mode is selected.

5. A lens-fitted photographic film unit as recited in claim 4, wherein said finder masking member is movable in cooperation with said changing means between a special mode position inside said field of view of said viewfinder, and a standard mode position outside said field of view of said viewfinder.

6. A lens-fitted photographic film unit as recited in claim 4, wherein said changing means is integrally formed with said finder masking member.

7. A lens-fitted photographic film unit as recited in claim 4, wherein said finder masking member is a masking plate having a rectangular opening which is smaller than an objective window of said viewfinder and has the same aspect ratio as said special size picture frame, said rectangular opening being coaxial with said objective window in said special mode position.

8. A lens-fitted photographic film unit as recited in claim 1, wherein said aperture masking plates are pivotally movable between said special photography position and a standard photography position for defining said standard size picture frame.

9. A lens-fitted photographic film unit as recited in claim 8, wherein each of said aperture masking plates is pivotal about an axis provided on a fixed end thereof parallel to the longitudinal direction of said photographic film, and distal ends of said aperture masking plates opposite to said fixed ends define top and bottom margins of said special size picture frame.

10. A lens-fitted photographic film unit as recited in claim 1, wherein said special size picture frame is a panoramic-size picture frame.

11. A lens-fitted photographic film unit as recited in claim 1, wherein said standard size picture frame is defined by said exposure aperture, and said aperture masking plates are retracted from an optical path of said exposure light in said standard photography position.

12. A lens-fitted photographic film unit as recited in claim 9, wherein each of said aperture masking plates has flat surfaces, and each said distal end has a convex edge, said aperture masking plates being disposed perpendicularly to said optical axis of said taking lens in said special photography position., 13. A lens-fitted photographic film unit as recited in claim 9, wherein each of said aperture masking plates has a convex surface, said convex surfaces being opposed complementarily to said forwardly concave film surface in said special photography position, while said distal ends extend parallel to the longitudinal direction of said photographic film in said special photography position.

14. A lens-fitted photographic film unit as recited in claim 9, wherein said distal ends define not only the top and bottom margins of said special size picture frame but also top and bottom margins of said standard size picture frame, and wherein each of said aperture masking plates has a rectangular shape and a convex surface, said convex surfaces being opposed to each other and inclined toward opposite directions relative to said optical axis of said taking lens in both of said special and standard photography positions.

15. A lens-fitted photographic film unit as recited in claim 9, wherein said aperture masking plates are mounted on a light-shielding box formed in front of said exposure aperture, and each of said aperture masking plates has at least a cut-out in the vicinity of pivots formed in said fixed end thereof, so as to permit said aperture masking plates to be mounted on said light-shielding box by snap-in engagement of said pivots, and a light blocking member for blocking light entering through each said cut-out.

16. A lens-fitted photographic film unit as recited in claim 15, wherein at least one of said aperture masking plates has a cut-out for permitting said at least one aperture masking plate to be retracted from said optical path inside said light shielding box, and a light blocking member for blocking light from entering through said cut-out.

17. A lens-fitted photographic film unit as recited in claim 9, wherein at least one of said aperture masking plates is curved to remove a portion between said fixed end and said distal end from said optical path, so as to reduce reflection of light from said at least one aperture masking plate.

18. A lens-fitted photographic film unit as recited in claim 17, wherein a second masking plate has a curved portion extending substantially diagonally to said optical axis so as to be removed the farther from said optical path the nearer to said exposure aperture, and a flange portion bent from said curved portion toward said optical axis and extending substantially parallel to said film surface, an edge of said flange portion extending in the longitudinal direction of said film strip forming said distal end.

19. A lens-fitted photographic film unit as recited in claim 18, wherein said light shielding box has a bottom wall which is curved along said optical axis so as to increase a space below said bottom wall in said lens-fitted photographic film unit, and said second aperture masking plate is disposed below said optical axis, said curved portion of said second aperture masking plate being shaped complementarily to said curved bottom wall.

20. A lens-fitted photographic film unit as recited in claim 19, wherein said second aperture masking plate has a cut-out in a middle of said curved portion for permitting said second aperture masking plate to be retracted from said optical path inside said light shielding box, and at least a light blocking member for blocking light from entering through said cut-out.

21. A lens-fitted photographic film unit as recited in claim 1, wherein at least one of said aperture masking plates has light trapping grooves extending orthogonally to said optical axis.

22. In a device for changing the exposure aperture size of a camera having an exposure aperture for exposing a film surface disposed behind said exposure aperture, said film surface being forwardly concave so as to correct distortion by a taking lens, said device comprising:

a photographic mode changing means which is manually actuable for selecting a standard photography mode for forming a standard size picture frame on said film surface or a special photography mode in which a special size picture frame smaller than said standard size picture frame may be formed; and first and second aperture masking plates disposed movably into and out of the front of said exposure aperture, said aperture masking plates being adapted to be set in a special photography position for masking out parts of said exposure aperture when said special photography mode is selected;

the improvement wherein said aperture masking plates have such shapes that, if images of said aperture masking plates are projected onto a plane perpendicular to an optical axis of said taking lens in said special photography position, said images have convexly curved top and bottom margins adjacent each other. lens in said special photography position, said images have convexly curved top and bottom margins adjacent each other.

23. A device as recited in claim 22, wherein said aperture masking plates are disposed perpendicular to said optical axis in said special photography mode position, and wherein edges of said aperture mask plates opposed to each other are convex toward said optical axis.

24. In a device for changing the exposure aperture size of a camera, said device comprising:

at least one masking plate for masking out a part of an exposure aperture of said camera which is pivotally mounted in a light shielding box surrounding an optical path of exposure light traveling through a taking lens to said exposure aperture;

the improvement comprising at least one cut-out formed in the vicinity of pivots of said masking plate to permit said pivots to be elastically deformed and snapped into bearings formed in said light shielding box; and a light blocking member for blocking light from entering through said cut-out.

25. In a device for changing the exposure aperture size of a camera, said device comprising:

at least one masking plate for masking out a part of an exposure aperture of said camera which is pivotally mounted in a light shielding box surrounding an optical path of exposure light traveling through a taking lens to said exposure aperture; the improvement comprising at least one cut-out for permitting said masking plate to be retracted from said optical path inside said light shielding box; and a light blocking member for blocking light from entering through said cut-out.

26. In a device for changing the exposure aperture size of a camera having an exposure aperture for defining a first size picture frame, said device comprising:

a pair of masking plates disposed above and below an optical axis of exposure light entering through a taking lens, said masking plates being pivotal about axes provided along a first end of each of said masking plates which is located on the side of said taking lens such that second ends of said masking plates opposite to said first ends define top and bottom margins of a second size picture frame which is smaller than said first size picture frame in a lateral direction of a photographic film disposed behind said exposure aperture;

the improvement wherein at a surface of least one of said masking plates is curved in a direction away from said optical axis, so as to reduce internal reflection of said exposure light.

* * * * *